US008560817B2

(12) United States Patent
Matsui

(10) Patent No.: US 8,560,817 B2
(45) Date of Patent: Oct. 15, 2013

(54) INFORMATION PROCESSING APPARATUS, INFORMATION PROCESSING SYSTEM, COMPUTER PROGRAM AND INFORMATION PROCESSING METHOD, DETERMINING WHETHER OPERATING ENVIRONMENT CAN BE ASSIGNED

(75) Inventor: Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 12/842,213

(22) Filed: Jul. 23, 2010

(65) Prior Publication Data
US 2010/0287362 A1 Nov. 11, 2010

Related U.S. Application Data

(63) Continuation of application No. PCT/JP2008/051102, filed on Jan. 25, 2008.

(51) Int. Cl.
*G06F 9/24* (2006.01)
*G06F 9/46* (2006.01)

(52) U.S. Cl.
USPC ......... 713/1; 713/2; 718/1; 718/100; 718/104

(58) Field of Classification Search
USPC ............................. 713/1, 2; 718/1, 100, 104
See application file for complete search history.

(56) References Cited

U.S. PATENT DOCUMENTS

| 7,110,516 | B2* | 9/2006 | Sarp et al. ............... 379/201.01 |
| 2005/0213123 | A1 | 9/2005 | Kobayashi |
| 2006/0143617 | A1* | 6/2006 | Knauerhase et al. ......... 718/104 |
| 2007/0079252 | A1* | 4/2007 | Ramnani ........................ 715/781 |
| 2007/0186212 | A1* | 8/2007 | Mazzaferri et al. ............... 718/1 |
| 2007/0198656 | A1* | 8/2007 | Mazzaferri et al. ........... 709/218 |
| 2007/0220120 | A1 | 9/2007 | Tsunehiro et al. |
| 2007/0300221 | A1* | 12/2007 | Hartz et al. ........................ 718/1 |
| 2008/0301770 | A1* | 12/2008 | Kinder ............................... 726/2 |

FOREIGN PATENT DOCUMENTS

| JP | 2001-282747 | 10/2001 |
| JP | 2004-318544 | 11/2004 |
| JP | 2005-204174 | 7/2005 |
| JP | 2007-179108 | 7/2007 |

(Continued)

OTHER PUBLICATIONS

Takahiro Shimizu et al., "C&C User Forum & iEXPO2005 Tokushu—Gijutsu Convergence ni yoru Ubiquitous Jidai no Senshin Solution—Business no Kakushin/Seihin • Gijutsu Client Togo Solution," NEC Technical Journal, Feb. 28, 2006, vol. 59, No. 1, pp. 37-40.

International Search Report for PCT/JP2008/051102, mailed on Mar. 4, 2008.

Japanese Office Action issued Aug. 14, 2012 in corresponding Japanese Patent Application No. 2009-550411.

English Translation of Japanese Patent Application No. 2007-179108, published Jul. 12, 2007.

(Continued)

*Primary Examiner* — Vincent Tran
(74) *Attorney, Agent, or Firm* — Staas & Halsey LLP

(57) ABSTRACT

It will be provided with an information processing apparatus, an information processing system, a computer program and an information processing method, which can prepare operating environment based on setting information distinctive in respective users without causing interference on operating environments for other users.

A controlling unit 10 of the information processing apparatus 1 can implement plural virtual PCs. When receiving a request for activating a virtual PC from a terminal apparatus, the controlling unit 10 obtains setting information from the terminal apparatus. The controlling unit 10 determines whether the setting information obtained from the terminal apparatus falls into acceptable range based on constraint conditions being set by a setting acceptable range template 13*d*. When having determined that the setting information falls into the acceptable range, the controlling unit 10 activates the virtual PC based on the setting information obtained from the terminal apparatus.

16 Claims, 14 Drawing Sheets

(56) References Cited

FOREIGN PATENT DOCUMENTS

| | | |
|---|---|---|
| JP | 2007-188139 | 7/2007 |
| JP | 2007-193429 | 8/2007 |
| JP | 2007-272449 | 10/2007 |
| JP | 2007-310901 | 11/2007 |

OTHER PUBLICATIONS

English Translation of Japanese Patent Application No. 2007-272449, published Oct. 18, 2007.

Japanese Office Action mailed Feb. 12, 2013, issued in corresponding Japanese Patent Application No. 2009-550411.

* cited by examiner

FIG. 3

| VIRTUAL PC-ID | STATUS INFORMATION |
|---|---|
| 100a | ACTIVE |
| 100b | INACTIVE |
| 100c | INACTIVE |
| ⋮ | ⋮ |

F I G. 1 0
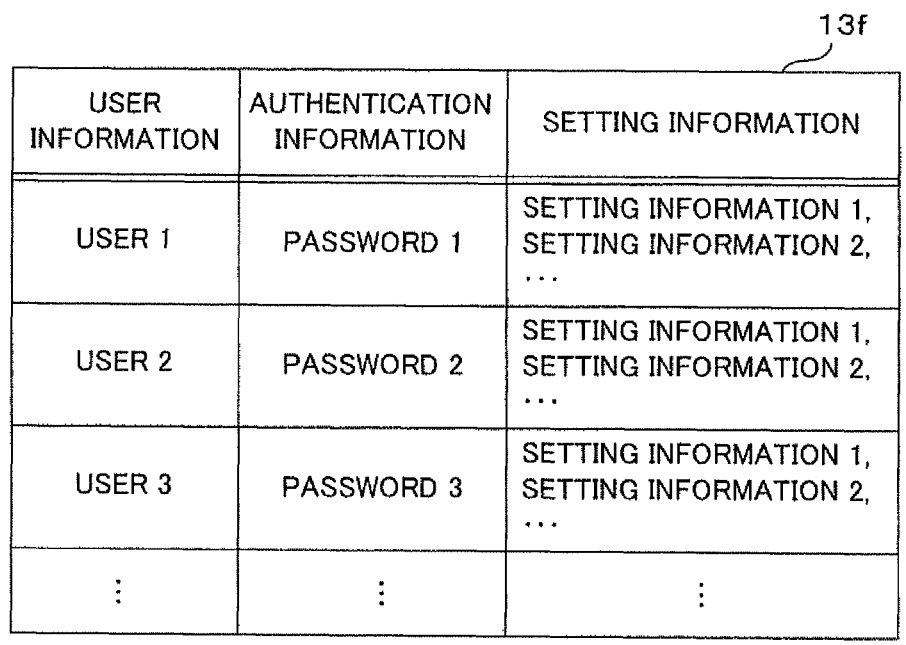

INFORMATION PROCESSING APPARATUS, INFORMATION PROCESSING SYSTEM, COMPUTER PROGRAM AND INFORMATION PROCESSING METHOD, DETERMINING WHETHER OPERATING ENVIRONMENT CAN BE ASSIGNED

CROSS-REFERENCE TO RELATED APPLICATIONS

This application is a continuation, filed under U.S.C. §111 (a), of PCT International Application No. PCT/JP2008/051102 which has an international filing date of Jan. 25, 2008 and designated the United States of America.

FIELD

The present invention relates to an information processing apparatus that implements performing computer processing for plural users with utilizing a thin-client system. Especially, the present invention relates to an information processing apparatus, an information processing system, a computer program and an information processing method for implementing to provide specific operating environment based on users who respectively have different setting information.

BACKGROUND

As communication infrastructure is developed and then recent society is called to be ubiquitous society, a user can carry a terminal apparatus that is able to provide various services to the user through communication network at any time and at any place. However, if much more functions are provided to such a terminal apparatus carried by a user in order to take much more various services, it causes increasing a cost of the terminal apparatus. Furthermore, if a high capacity storage is provided to such a terminal apparatus, it causes problems about theft, lost and the like. In short, in the case that the user loses the terminal apparatus, it causes leaking secret information, such as personal information and confidential business information, stored on the lost terminal apparatus, and thus it cannot protect the secret information stored on the lost terminal apparatus.

Then, it becomes popular to utilize a thin client system. In the thin client system, such a terminal apparatus carried by a user is configured with minimum hardware, such as a memory, a network card and a graphic card. Actual main processing is performed on a server apparatus connected to the terminal apparatus through network. The terminal apparatus receives only results of the processing performed by the server apparatus, and displays information on the monitor based on the received results (Patent Application Laid-Open No. 2001-282747). Thus, it is possible to minimize the hardware required in the terminal apparatus, save cost and prevent further leaking information.

In addition, a thin client system with virtual personal computer (PC) technique has attracted attention for saving cost. The virtual PC technique is for virtualizing the hardware in the server apparatus with utilizing a virtual machine monitor technique (VMM technique), a hypervisor technique or the like, and then for operating plural guest OSs (virtual PC). Thus, it is possible to increase the number of terminal apparatuses that can simultaneously connect to the server apparatus.

[Patent Document 1] Patent Application Laid-Open No. 2001-282747

SUMMARY

Regardless for company or for individual, the terminal apparatus such as a PC, that a user has already utilized, includes a hard disk or a non-volatile memory that stores various setting information, such as setting information for operation of operating system (OS) being set by the user and setting information for each application, authentication information for authenticating and the like. Such the hard disk or the non-volatile memory may store various setting information being set by an administrator in a company in order to empower security. The terminal apparatus can repeat operations based on the setting information being already set, with utilizing such the stored various information.

The thin client system is a relatively recent system, and it is expected that many companies and individual users will be customers of the thin client system. Furthermore, it is expected that some companies and individual users will be customers of the thin client system for second terminal apparatus although they have already utilized own first terminal apparatus. In this expectation, they may be willing to utilize the setting information of the first terminal apparatus even for the second terminal apparatus in the thin client system.

However, in the case that a user wants to reflect the various information being set for the terminal apparatus already utilized by the user even into the new terminal apparatus of the thin client system, the user must set the various information even for the new terminal apparatus of the thin client system. Thus, there are huge workloads on each user. In addition, it is expected that the elderly, the housewife and the like may be a target for providing the thin client system. Even for this expectation, it is important to simplify setting manipulation for such the various setting information.

The present invention is made in view of such circumstances, and has a primary object to provide an information processing apparatus, an information processing system, a computer program and an information processing method for implementing to reflect various setting information of a terminal apparatus, such as PC, already utilized by each user even into another terminal apparatus of thin client system in order to improve convenience of user, with preventing to interfere with the operating environment of another user in the thin client system.

An information processing apparatus according to the present invention: is connected to an external device through a network; has a performing means for performing various processing, obtains a connect request, from the external device, which includes user information for identifying a user and authentication information for authenticating the user; obtains setting information about operation of each processing performed by the performing means; determines in reference to the user information and the authentication information included in the obtained connect request whether it is possible to connect in accordance with the obtained connect request or not; determines, when it has been determined that it is possible to connect, whether the obtained setting information obtained is within acceptable range based on a predetermined constraint condition for operations of various processing performed by the performing means or not; sets, when it has been determined that the obtained setting information is within the acceptable range, an operating environment for various processing performed by the performing means in accordance with the obtained setting information; and assigns the set operating environment to the external device.

Another information processing apparatus according to the present invention: obtains manipulation information, from the external device, which represents manipulation for processing performed by the operating environment assigned to the external device; generates an image signal utilized for displaying in accordance the obtained manipulation information; and sends the generated image signal to the external device.

Another information processing apparatus according to the present invention: releases the operating environment assigned to the external device from the external device, when a disconnect request is obtained from the external device which represents a completion of processing performed by the operating environment assigned to the external device; and initializes the operating environment released from the external device on the basis of a predetermined default setting information.

An information processing system according to the present invention includes a central apparatus having a performing means for performing various processing and a terminal apparatus connected to the central apparatus through a network, wherein the terminal apparatus sends a connect request having user information for identifying a user and authentication information for authenticating the user toward the central apparatus and sends setting information about operation of various processing performed by the performing means of the central apparatus toward the central apparatus, and wherein the central apparatus obtains the connect request from the terminal apparatus, obtains the setting information from the terminal apparatus, determines in reference to the user information and the authentication information included in the obtained connect request whether it is possible to connect in accordance with the connect request or not, determines when the it has been determined that it is possible to connect whether the obtained setting information is within acceptable range based on a predetermined constraint condition for operations of various processing performed by the performing means or not, sets an operating environment for various processing performed by the performing means in accordance with the obtained setting information when it has been determined that the obtained setting information is within the acceptable range, and assigns the set operating environment to the external device.

A computer program according to the present invention makes a computer perform just like the information processing apparatus described above, when being read by the computer. In other words, when the computer program is read and executed by the computer, the computer program: makes the computer determine, in reference to the user information and the authentication information included in the connect request obtained from the external device, whether it is possible to connect in accordance with the obtained connect request; makes the computer determine, when the computer has determined that it is possible to connect, whether the obtained setting information is within acceptable range based on a predetermined constraint condition for operations of various processing performed by the performing means or not; makes the computer set, when the computer has determined that the obtained setting information is within the acceptable range, an operating environment for various processing performed by the performing means in accordance with the obtained setting information; and makes the computer assign the set operating environment to the external device.

Another computer program according to the present invention, when being read and executed by the computer: makes the computer generate an image signal utilized for displaying in accordance the manipulation information obtained from the external device; and makes the computer send the generated image signal to the external device.

Another computer program according to the present invention, when being read and executed by the computer: makes the computer release the operating environment assigned to the external device, when the computer obtains the disconnect request representing a completion of processing performed by the assigned operating environment from the external device; and makes the computer initialize the operating environment released from the external device on the basis of a predetermined default setting information.

An information processing method according to the present invention: utilizes an information processing apparatus connected to an external device through a network and including a performing means for performing various processing; makes the information processing apparatus obtain a connect request, from the external device, which includes user information for identifying a user and authentication information for authenticating the user; making the information processing apparatus obtain setting information about operation of each processing performed by the performing means; making the information processing apparatus determine, in reference to the user information and the authentication information included in the obtained connect request, whether it is possible to connect in accordance with the obtained connect request; making the information processing apparatus determine, when the information processing apparatus has determined that it is possible to connect, whether the obtained setting information is within acceptable range based on a predetermined constraint condition for operations of various processing performed by the performing means or not; making the information processing apparatus set, when the information processing apparatus has determined that the obtained setting information is within the acceptable range, an operating environment for various processing performed by the performing means in accordance with the obtained setting information; and making the information processing apparatus assign the set operating environment to the external device.

Another information processing method according to the present invention: makes the information processing apparatus the information processing apparatus obtain manipulation information representing manipulation for processing performed by the assigned operating environment; makes the information processing apparatus generate an image signal utilized for displaying in accordance the obtained manipulation information; and makes the information processing apparatus send the generated image signal to the external device.

Another information processing method according to the present invention: makes the information processing apparatus release the operating environment assigned to the external device, when the information processing apparatus obtains the disconnect request representing a completion of processing performed by the assigned operating environment from the external device; and makes the information processing apparatus initialize the operating environment released from the external device on the basis of a predetermined default setting information.

According to an aspect of the information processing apparatus, it is determined whether connect should be allowed or not in accordance with the connect request obtained from the external device. Therefore, it is possible to allow to connect in response to the connect request instructed only by an authorized user. Further, according to another aspect of the information processing apparatus, it is determined whether the setting information obtained from the external device whose connect is determined to be allowed is within an acceptable range based on a predetermined constraint condition or not. Therefore, it is possible to determine whether the performing means can normally work or not on the basis of operating environment for various processing performed by the performing means which is set in accordance with the setting information. Furthermore, according to another aspect of the information processing apparatus, the operating environment is set in accordance with the setting information and the set operating environment is assigned to the external device, when the setting information obtained from the external device is determined to be within the acceptable range. Therefore, it is possible to set the operating environment based on the externally obtained setting information for the external device.

According to another aspect of the information processing apparatus, the image signal is generated for displaying a screen based on the obtained manipulation information for the processing performed by each operating environment. Therefore, it is possible to implement operations, for example, of the server apparatus in the thin client system.

According to another aspect of the information processing apparatus, the operating environment assigned to the external device is released from the external device and is initialized after the disconnect request is obtained which represents a completion of processing performed by each operating environment. Therefore, it does not keep the setting information of the operating environment whose operation is ended, for the time when other operating environments subsequently start performing operations.

According to another aspect of the information processing apparatus, the operating environment can be set for the external device on the basis of the setting information obtained from the external device. In the case that such the information processing apparatus is applied the server apparatus in the thin client system, it is possible to reflect the various setting information of the terminal apparatus, such as a PC, having been already utilized by the user into the thin client system, without complicated setting manipulation. As described above, it is possible to set the setting condition for the thin client system, easily. Therefore, it is possible to introduce the thin client system easily for the user who already utilizes the first terminal apparatus and wants to utilize the second terminal apparatus of the thin client system and for the user, such as the elderly and the housewife, who is unfamiliar with manipulation of terminal apparatuses.

According to another aspect of the information processing apparatus, the operating environment is determined whether to work correctly without interfering with the operating environment of another user at the time when the operating environment is set for the external device on the basis of the setting information obtained from the external device or not. Therefore, it can prevent causing the interference with the operating environment of another user in the thin client system, even in the case that the setting information of the terminal apparatus, such as a PC, having been already utilized by each user is reflected into the thin client system.

The above and further objects and features of the invention will more fully be apparent from the following detailed description with accompanying drawings.

BRIEF DESCRIPTION OF DRAWINGS

FIG. 3 is a schematic view showing registered data of virtual PC status table.

FIG. 10 is a schematic view showing registered data of setting information registration table.

DESCRIPTION OF EMBODIMENTS

Hereinafter, it will be described about information processing system according to the present invention which includes an information processing apparatus according to the present invention (central apparatus) with reference to figures showing embodiments applied to a thin client system. It should be noted that the information processing system according to the present invention is explained in the context of thin client system with virtual PC rule that virtualizes hardware of the information processing apparatus and then operates plural virtual PCs (guest OSs) in the following description.

(Embodiment 1)

Figure 1:
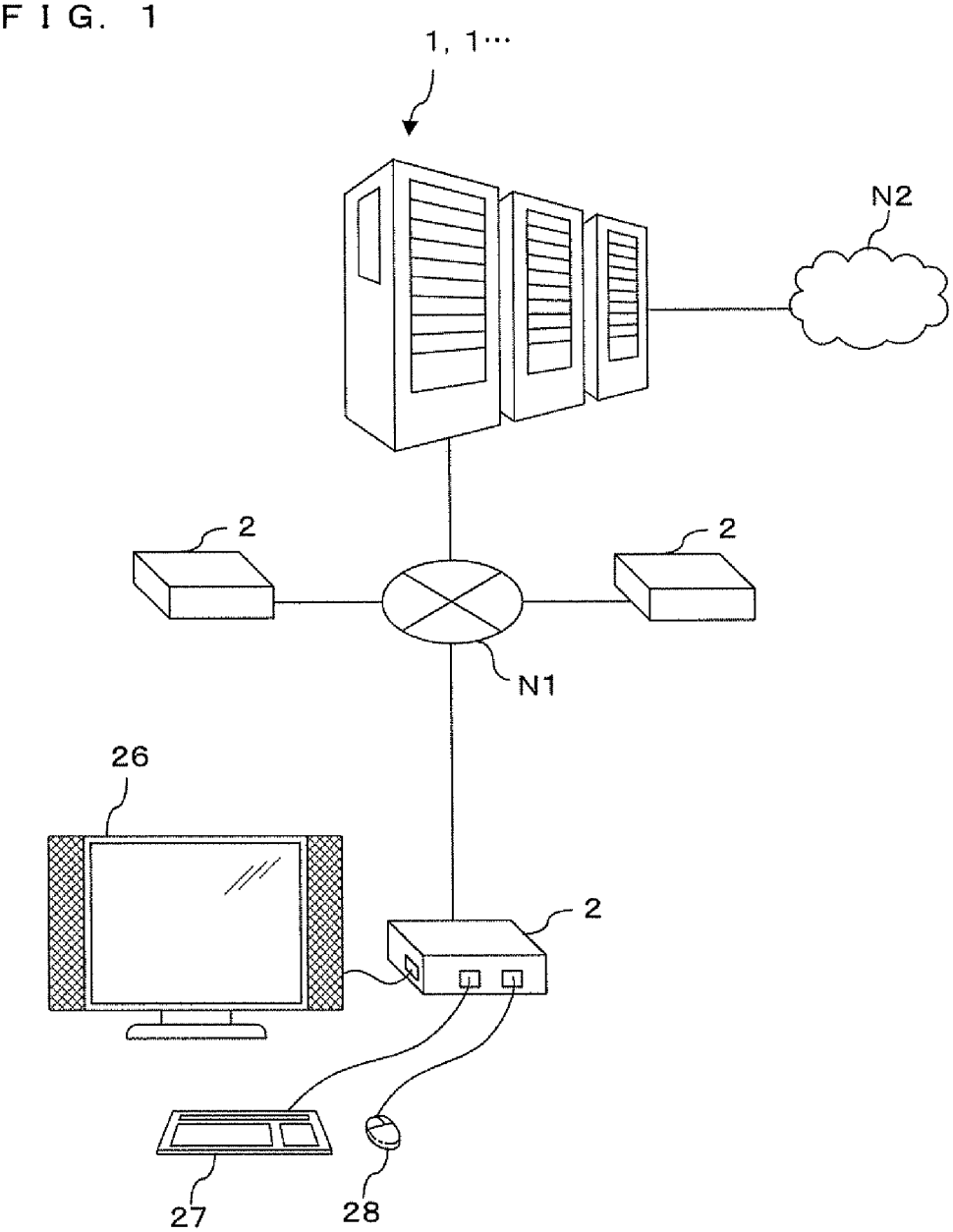
FIG. 1 is a schematic view showing a composition example of client system according to embodiment 1.

It will be described below about thin client system according to embodiment 1. FIG. 1 is a schematic view showing a composition example of the client system according to the embodiment 1. The thin client system according to the embodiment 1 is configured to include: information processing apparatuses 1, 1, ... according to the present invention; a network N1; and terminal apparatuses (external devices) 2, 2, ... connected to the information processing apparatuses 1, 1, ... through the network N1.

These information processing apparatuses 1, 1, ... are connected with a public communication network N2, too. It may be desirable to provide with an internet protocol (IP) communication network dedicated to transmitting high quality images, as the network N1. Each of the information processing apparatuses 1, 1, ... is configured by a server computer. The terminal apparatuses 2, 2, ... are configured with set top boxes (STBs) each of which is connected to a television receiver (TV) 26, while being utilized as thin client. Each of the terminal apparatuses 2, 2, ... is configured to be connectable to a keyboard 27 and a mouse 28, in addition to the TV 26. Thus, the function of thin client is implemented with the terminal apparatus 2, the TV 26, the key board 27 and the mouse 28.

It should be noted that the terminal apparatuses 2, 2, . . . are not limited to these configurations for the thin client. Alternatively, each of the terminal apparatuses 2, 2, . . . may be configured with a personal computer having no storage, such as HD, or a television receiver having a function of STB and having a function connectable to the keyboard and the mouse.

For illustration purposes, it will be described below about the case that one information processing apparatus 1 is connected to many terminal apparatuses 2, 2, . . . . The information processing apparatus 1 is provided with virtualization technique for making one apparatus perform operations as if plural apparatuses, and is configured to activate virtual PCs (guest OSs) corresponding to respective terminal apparatuses 2, 2, . . . in order to perform the operations. The information processing apparatus 1 is configured to activate a virtualization server 101 (See FIG. 5 and FIG. 6) that has functions to activate and stop each virtual PC and to control operations of each virtual PC.

As for the client system described above, the information processing apparatus 1 receives a connect request signal for requesting activation (login) of virtual PC from the terminal apparatus 2, then activates a virtual PC corresponding to the received connect request, generates an image signal for displaying images on the TV 26 based on an image drawing instruction signal being output by the activated virtual PC, and transmits the generated image signal to the terminal apparatus 2. At that time, the information processing apparatus 1 obtains address information of the terminal apparatus 2 corresponding to the activated virtual PC, and transmits IP packets including the generated image signal based on the image drawing instruction signal being output by the virtual PC toward the network N1 for a destination based on the obtained address information. Thus, terminal apparatus 2 can receive the transmitted image signal, display images on the TV 26 and start performing operations as the thin client.

Figure 2:
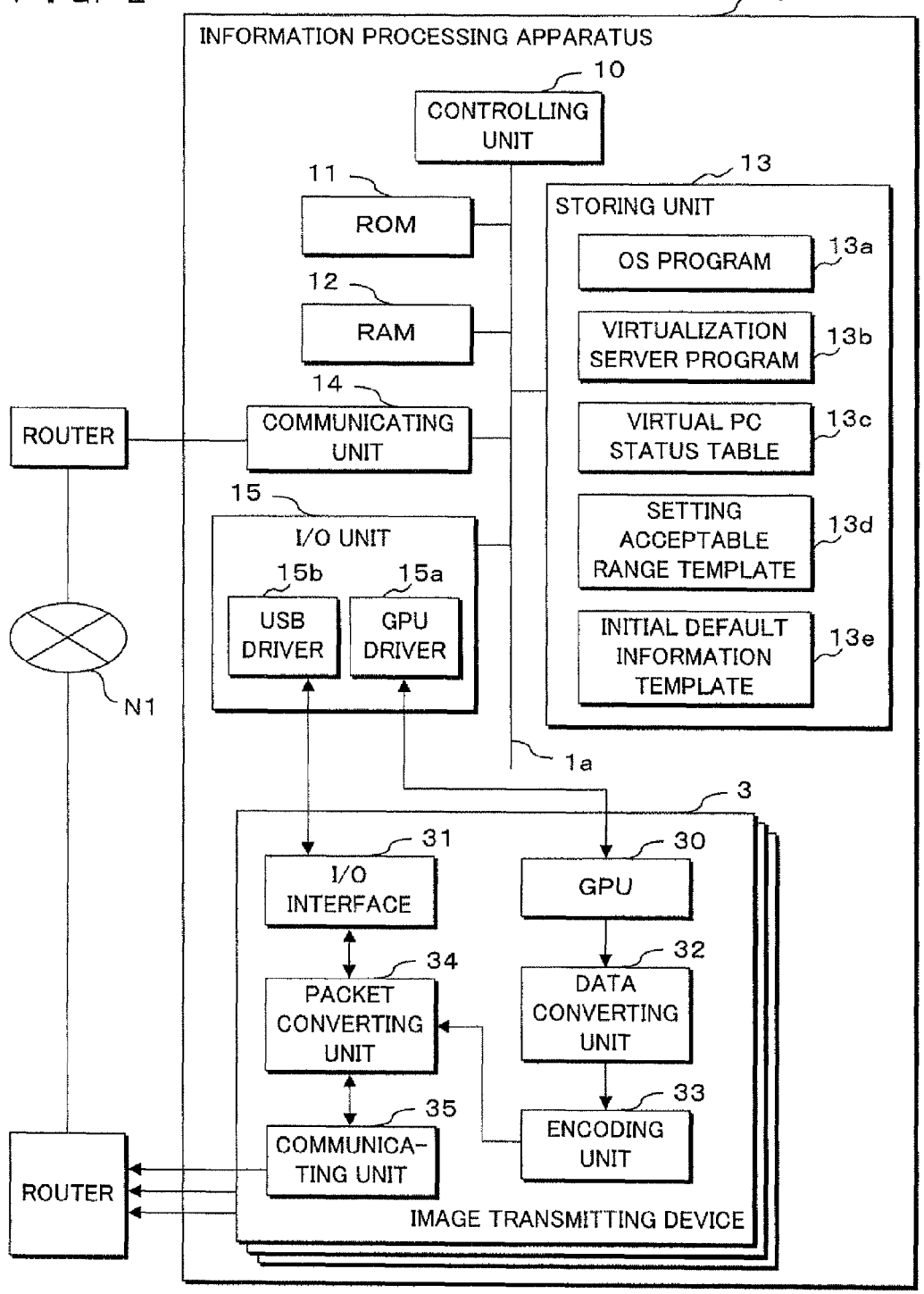
FIG. 2 is a block diagram showing inner components of information processing apparatus according to the embodiment 1.

FIG. 2 is a block diagram showing inner components of the information processing apparatus according to the embodiment 1. The information processing apparatus 1 according to the embodiment 1 may be implemented when a computer reads and executes the computer program according to the present invention. Alternatively, the information processing apparatus 1 according to the embodiment 1 may be configured with a specific apparatus.

The information processing apparatus 1 is configured with a server computer apparatus connected to the network N1 through a router. As shown in FIG. 1, the information processing apparatus 1 is connected to the public communication network N2, too (not shown in FIG. 2). The information processing apparatus 1 includes a controlling unit 10, a ROM 11, a RAM 12, a storing unit 13, a communicating unit 14, an I/O unit 15 and the like, which are connected to each other via a bus 1*a*. The information processing apparatus 1 includes plural image transmitting devices 3, 3, . . . connected to the I/O unit 15, too.

The controlling unit 10 is configured with a central processing unit (CPU), a micro processor unit (MPU) or the like, which properly reads out a control program previously stored on the ROM 11 or the storing unit 13 onto the RAM 12, executes the read control program, and controls the operations of each hardware unit described above. The ROM 11 previously stores various control programs required for making the information processing apparatus 1 according to the embodiment 1 perform the operations as the information processing apparatus according to the present invention. The RAM 12 is configured, for example, with a SRAM or a flash memory which temporally stores various data generated in response to the control programs executed by the controlling unit 10.

The storing unit 13 is a high capacity storage, such as a hard disk drive (HDD). The storing unit 13 stores various control programs required for making the information processing apparatus 1 according to the embodiment 1 perform operations as the information processing apparatus according to the present invention, an OS program 13*a*, a virtualization server program 13*b*, a virtual PC status table 13*c* as shown in FIG. 3, a setting acceptable range template 13*d*, an initial default information template 13*e* and various data.

The OS program 13*a* is OS software, such as Windows (registered trade mark) or Linux (registered trade mark), which includes functions of command user interface (CUI) and/or graphic user interface (GUI) for allowing a user to manipulate. The controlling unit (performing means) 10 reads out and executes the OS program 13*a* and thus performs operations as if a virtual PC 100 (See FIG. 5). Further, the controlling unit 10 performs various processing, generates the image drawing instruction signal for displaying image screen including the CUI and the GUI to be displayed in accordance with the performed processing, and outputs the generated image drawing instruction signal to the image transmitting device 3. Furthermore, the controlling unit 10 receives a control signal (manipulation information) from an I/O device, such as the keyboard and the mouse, during performing operations as the virtual PC 100, performs various processing based on this received control signal, and outputs a sound signal and the like, as well as the image drawing instruction signal for displaying the CUI and GUI in accordance with the performed processing, toward the transmitting apparatus 3.

The virtualization server program 13*b* is a main program required for performing various processing in order to make the information processing apparatus 1 perform operations as if the information processing apparatus according to the present invention. In other words, the virtualization server program 13*b* is software for implementing the virtualization technique in order to operate plural virtual PCs 100, 100, . . . on the information processing apparatus 1. The controlling unit 10 reads out and executes the virtualization server program 13*b*, and thus performs operations as the virtualization server 101. Hence, the controlling unit 10 can provide virtualizing environment for making the information processing apparatus 1 perform operations as plural information processing apparatuses logically. Therefore, it is possible to generate logically independent plural virtual PCs that perform operations on the information processing apparatus 1. The controlling unit 10 is configured with a multi-core CPU optimally designed to position each of the virtual PCs 100, 100, . . . and the virtualization server 101 on physically separated areas of the CPU core. Alternatively, the controlling unit 10 may be configured with a single-core CPU.

The controlling unit 10 executes the virtualization server program 13*b*, then performs operations as the virtualization server 101, thus implements managing the relation between the software and the hardware and performs basic controls on the operations of hardware corresponding to respective virtual PCs 100, 100, . . . . As performing operations as the virtualization server 101, the controlling unit 10 further reads out and executes the OS program 13*a* corresponding to the connect (activation) request from each of the terminal apparatuses 2, 2, . . . , and activates respective virtual PCs 100, 100, . . . . In this case, the controlling unit 10 controls assigning hardware utilized for respective virtual PCs 100, 100, . . . , i.e., assigning the controlling unit 10, the RAM 12, the communicating unit 14 and the image transmitting devices 3, 3, . . . , and detects un-assigned image transmitting device 3.

It will be described later in reference with FIG. 5 and FIG. 6 about detailed processing based on the operation performed by the controlling unit 10 as the virtualization server 101. Further, it will be described later in reference with FIG. 3 about detailed data registered in the virtual PC status table 13c. Furthermore, it will be described later about the setting acceptable range template 13d and the initial default information template 13e.

The RAM 12 is utilized when the controlling unit 10 reads out the OS program 13a and the virtualization server program 13b, is utilized for temporally storing respective information when the controlling unit 10 reads out and executes respective control programs and performs respective processing, and is utilized for storing setting information for respective terminal apparatuses 2, 2, . . . corresponding to the operations performed by the controlling unit 10 as respective virtual PCs 100, 100, . . . . Therefore, the RAM 12 is also logically divided into plural memories and assigned to respective virtual PCs 100, 100, . . . and the virtualization server 101.

The communicating unit 14 is hardware that includes, for example, a network card and implements communicating with the terminal apparatuses 2, 2, . . . through the network N1. The communicating unit 14 is additionally connected to the public communication network N2, and thus respective virtual PCs 100, 100, . . . can obtain via the communicating unit 14 various information, such as movies, images and text data published through the public communication network N2. Alternatively, it may be provided with distinct two communicating units, i.e., a communicating unit for connecting to the network N1 and another communicating unit for connecting to the public communication network N2.

The I/O unit 15 is an input/output interface including a serial transfer bus slot, such as a peripheral component interconnect (PCI). The I/O unit 15 may include, for example, a graphics processing unit (GPU) driver 15a and an universal serial bus (USB) driver 15b and implement transmitting various control signal including the image drawing instruction signal between the image transmitting devices 3, 3, . . . described later.

The image transmitting device 3 is configured with a PCI (PCI-Express) board and includes a GPU 30, an I/O interface 31, a data converting unit 32, an encoding unit 33, a packet converting unit 34, a communicating unit 35 and the like.

During a period that the controlling unit 10 of the information processing apparatus 1 is performing operations as respective virtual PCs 100, 100, . . . , an image drawing instruction signal is generated. The GPU 30 obtains the generated image drawing instruction signal via the GPU driver 15a of the I/O unit 15, generates an image signal representing a display screen based on the obtained image drawing instruction signal, and transmits the generated image signal to the data converting unit 32.

The data converting unit 32 performs data conversion processing for inputting the image signal generated by the GPU 30 into the encoding unit 33, and transmits the image signal to the encoding unit 33 on which the data conversion processing has been performed. The encoding unit 33 is an encoder chip for performing compression coding processing on the image signal, on which the data converting unit 32 has performed the data conversion processing, to be a digital picture signal, such as H. 264. The encoding unit 33 transmits the digital picture signal, on which the compression coding processing has been performed, to the packet converting unit 34.

The I/O interface 31 is configured, for example, with an USB interface for transmitting and receiving various control signals to and from the USB driver 15b of the I/O unit 15. As the control signal is generated to include sound signals being output in response to the operations performed by the controlling unit 10 of the information processing apparatus 1 as respective virtual PCs 100, 100, . . . , the I/O interface 31 has functions for relaying the control signal including the output sound signals to respective I/O devices of the terminal apparatus 2, such as the TV 26, the keyboard 27, the mouse 28 and a speaker (not shown). The I/O interface 31 has functions, on the contrary, for relaying a control signal (described later) obtained from the respective I/O devices of the connected terminal apparatus 2 toward the controlling unit 10 on which the corresponding virtual PC 100 performs operations.

The packet converting unit 34 performs packetization processing to generate IP packet from the digital picture signal on which the encoding unit 33 has performed the compression coding processing or from the control signal obtained through the I/O interface 31, and transmits the generated IP packet to the communicating unit 35. In the case that the I/O interface 31 is configured with the USB interface, the packetization processing has been performed on the control signal already. Thus, it is easy for the packet converting unit 34 to contain the control signal obtained through the I/O interface 31 into the IP packet. In addition, the packet converting unit 34 performs reverse packetization processing on the control signal which is received from the terminal apparatus 2 through the communicating unit 35 and on which the packetization processing has been performed, and thus obtains the control signal.

The communicating unit 35 includes, for example, a network card, and implements packet transmission with the terminal apparatuses 2, 2, . . . through the network N1. Specifically, the communicating unit 35 outputs toward the network N1 of the IP packet generated in response to the packetization processing that is performed on the digital picture signal being output from the encoding unit 33 or on the control signal obtained from the USB driver 15b through the I/O interface 31. The encoding unit 33 may encode the sound signal being output from the controlling unit 10 of the information processing apparatus 1 through the I/O unit 15 (GPU driver 15a) and may multiplex the encoded sound signal and picture signal.

The controlling unit 10 of the information processing apparatus 1 outputs destination information to the image transmitting devices 3, 3, . . . through the I/O unit 15, as the destination information may include address information of the terminal apparatus 2 corresponding to respective virtual PC 100, 100, . . . . The packet converting unit 34 of the image transmitting device 3 contains the image signal into the IP packet based on the destination information, and externally outputs the IP packet through the communicating unit 35. After the output from the communicating unit 35 of the image transmitting device 3, the IP packet is transmitted to the terminal apparatus 2 corresponding to the address information through a communication path, such as a router.

The image transmitting device 3 is configured to receive the image drawing instruction signal through the GPU 30. In the case that the image transmitting device 3 is expected to be a first destination to which the controlling unit 10 of the information processing apparatus 1 outputs the image drawing instruction signal corresponding to operations, it is considered that the image transmitting device 3 is similar to a graphic card, a graphic accelerator or the like generally included in a personal computer. Therefore, it does not require for dramatically improving output processing of the image drawing instruction signal performed by the controlling unit 10 of the information processing apparatus 1, because the image transmitting device 3 is provided.

As being output to the image transmitting device 3 by the controlling unit 10 of the information processing apparatus 1, the destination information may indirectly show the address of the terminal apparatus 2. The destination information may be configured with network address information and port number allocated to the communicating unit 35 of the image transmitting device 3 or the communicating unit of other apparatus, then the communicating unit 35 may output the IP packet in which the image signal is contained toward the port represented by the destination information, and the terminal apparatus 2 may obtain the output IP packet from the port.

FIG. 3 is a schematic view showing registered data of virtual PC status table. While the respective virtual PCs 100, 100, . . . are activated in response to the OS program 13*a* executed by the controlling unit 10 of the information processing apparatus 1, the virtual PC status table 13*c* stores virtual PC-IDs for identifying the respective virtual PCs 100, 100, . . . and status information about the respective virtual PCs 100, 100, . . . in association with each other. The virtual PC-ID in the virtual PC status table 13*c* has been registered at the time when the information processing apparatus 1 starts performing operations as the server apparatus in the thin client system. The status information in the virtual PC status table 13*c* is updated to be "active" or "inactive" by the controlling unit 10 performing operations as the virtualization server 101, every time when the controlling unit 10 activates respective virtual PCs 100, 100, . . . or leads shutdown (stop) of respective virtual PCs 100, 100, . . . .

It is not illustrated about details of setting acceptable range template 13*d* and default information template 13*e*. As the controlling unit 10 performing operations as the virtualization server 101 reads out and executes the OS program 13*a* corresponding to the connect (activation) request transmitted from the terminal apparatuses 2, 2, . . . authenticated by the authenticating means 102 (see FIG. 6), the operating environment is set in accordance with the setting information obtained from the terminal apparatuses 2, 2, . . . . The setting acceptable range template 13*d* is utilized for confirming that another operating environment of another user (other virtual PCs 100, 100, . . . ) will not take interference from the activation of respective virtual PCs 100, 100, . . . based on the setting information which are obtained from the terminal apparatuses 2, 2, . . . .

The default information template 13*e* is utilized for setting the operating environment of the respective virtual PCs 100, 100, . . . to be the default status (initialization), in the case that the operations of the respective virtual PCs 100, 100, . . . are stopped by the controlling unit 10 performing operations as the virtualization server 101. For example, it is possible to utilize dump images of memory in the case that the virtual PC 100 is activated in accordance with the default setting information.

Figure 4:
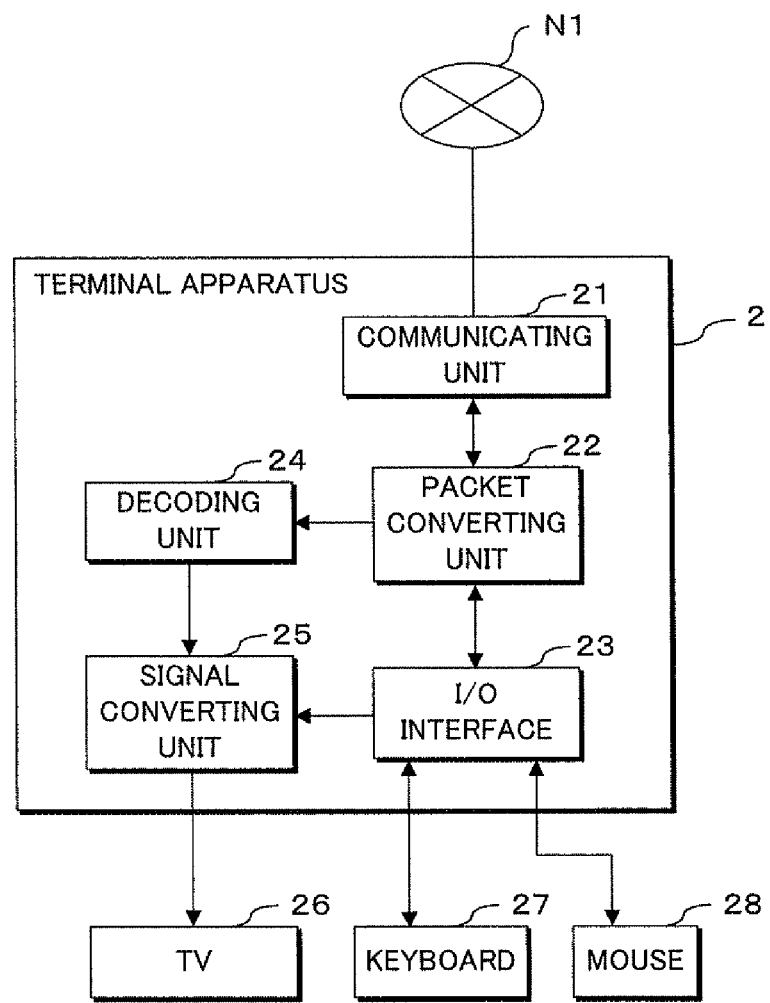
FIG. 4 is a block diagram showing inner components of terminal apparatus according to the embodiment 1.

FIG. 4 is a block diagram showing inner components of the terminal apparatus 2 according to the embodiment 1. The terminal apparatus 2 according to the embodiment 1 includes, a communicating unit 21, a packet converting unit 22, an I/O interface 23, a decoding unit 24, a signal converting unit 25 and the like. The communicating unit 21 includes, for example, a network card, and implements communication with the information processing apparatus 1 through the network N1. The communicating unit 21 obtains packet from the image transmitting device 3 assigned to the virtual PC 100 corresponding to own terminal apparatus 2, and transmits the obtained packet to the packet converting unit 22.

The packet converting unit 22 performs reverse packetization processing on the packet obtained through the communicating unit 21, obtains control signal containing picture signal or sound signal from the obtained packet, and outputs the obtained control signal to the decoding unit 24 or the I/O interface 23. The packet converting unit 22 performs packetization processing on the control signal obtained from the I/O device, such as a keyboard 27 and a mouse 28, through the I/O interface 23, and transmits the control signal on which the packetization processing has been performed toward the communicating unit 21. In this case, the communicating unit 21 transmits the control signal on which the packetization processing has been performed by the packet converting unit 22 toward the virtual PC 100 corresponding to own terminal apparatus 2.

The decoding unit 24 is a decoder chip for decoding digital picture signal, such as H. 264. In the case that the compression coding processing has been performed on the digital picture signal obtained by the packet converting unit 22, the decoding unit 24 decodes this digital picture signal and transmits the decoded digital picture signal to the signal converting unit 25.

The I/O interface 23 is an I/O unit for receiving I/O signals from various devices, such as an USB interface. The I/O interface 23 is connected to I/O devices, such as the keyboard 27, the mouse 28 and a speaker (not shown), and performs transmission of I/O signals with respective I/O devices. In the case that the terminal apparatus 2 can be controlled with a remote controller (not shown), the I/O interface 23 may similarly receive I/O signals from the remote controller. In the case that sound signal is transmitted from the packet converting unit 22, the I/O interface 23 receives the sound signal and transmits the received sound signal to the signal converting unit 25. In the case that the speaker is connected to the I/O interface 23, the I/O interface 23 may utilize the speaker for outputting the sound signal received from the packet converting unit 22.

The signal converting unit 25 performs data conversion processing for inputting the image signal decoded by the decoding unit 24 into the TV 26, and transmits the image signal on which the data conversion processing has been performed toward the TV 26. In the case that the signal converting unit 25 receives sound signal from the I/O interface 23, the signal converting unit 25 transmits the received sound signal to the TV 26, too.

Hereinafter, it will be described about functions of the information processing apparatus 1 that are implemented by the controlling unit 10 executing the control program stored in the ROM 11 or the storing unit 13, as the information processing apparatus 1 has configurations described above. FIG. 5 is a block diagram showing a functional composition of the information processing apparatus 1. FIG. 6 is a block diagram showing a functional composition of the virtualization server 101. In the information processing apparatus 1 according to the embodiment 1, the controlling unit 10 executes the OS program 13*a* and the virtualization server program 13*b* stored on the storing unit 13, and thus respective functions are implemented for the virtual PCs (a first virtual PC and a second virtual PC) 100, 100.

Figure 5:
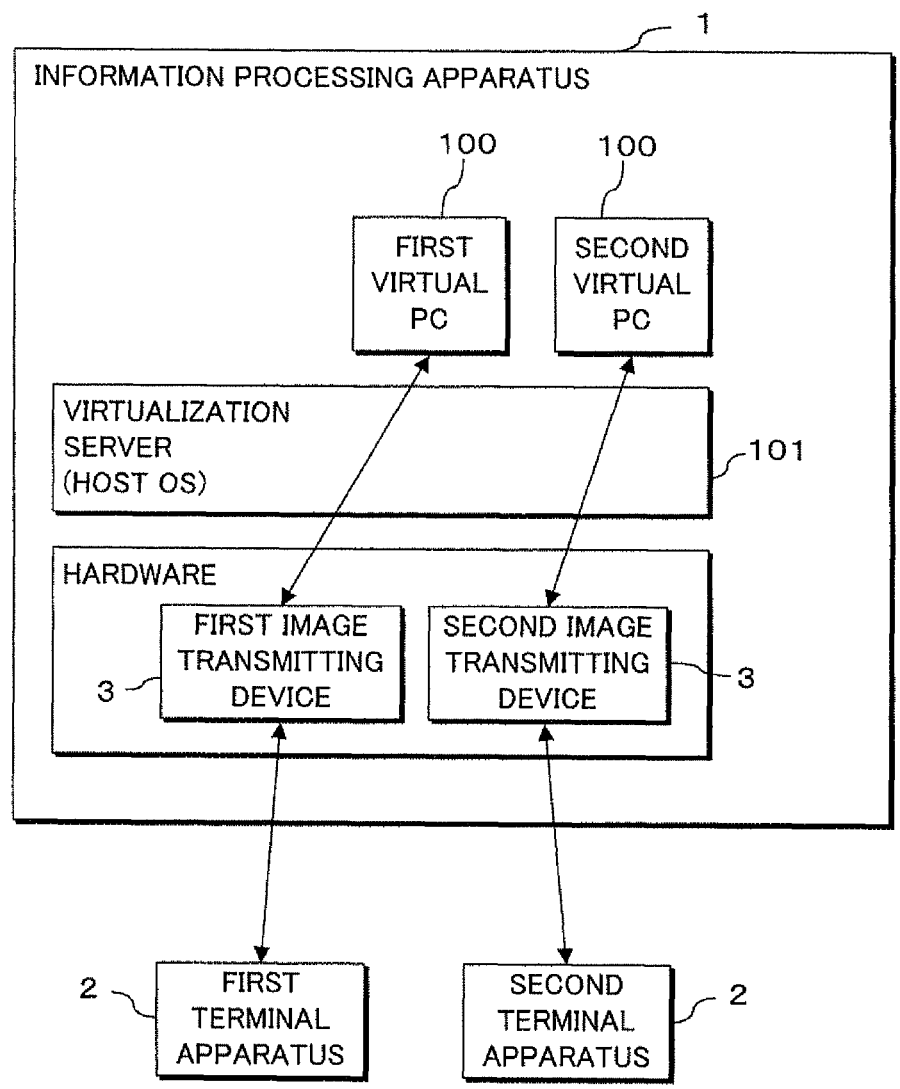
FIG. 5 is a block diagram showing a functional composition of the information processing apparatus.

FIG. 5 illustrates that plural virtual PCs (guest OSs) 100, 100 are generated independently with each other on the hardware of the information processing apparatus 1 including the controlling unit 10, the RAM 12, the storing unit 13, the communicating unit 14, the image transmitting device 3 and the like, in response to the operations performed by the virtualization server 101 (host OS). In addition, FIG. 5 illustrates the correspondence between respective terminal apparatuses 2, 2, . . . and respective virtual PCs 100, 100. In FIG. 5, words "first" and "second" are provided for clearly showing the correspondence between the virtual PC 100, the image transmitting device 3 and the terminal apparatus 2. In other words, the first terminal apparatus 2 corresponds to the first virtual PC 100 and the first image transmitting device 3, and the second terminal apparatus 2 corresponds to the second virtual PC 100 and the second image transmitting device 3.

In the case that the controlling unit 10 receives the connect request signal from the terminal apparatuses 2, 2, . . . during executing the virtualization server program 13b and performing the operations as the virtualization server 101, the controlling unit 10 assigned corresponding OS program 13a and corresponding image transmitting device 3 to respective terminal apparatuses 2, 2, . . . in accordance with the received connect request signal. The virtualization server 101 executes the OS program 13a assigned to respective terminal apparatuses 2, 2, . . . , activates the image transmitting device 3, and thus activates the corresponding virtual PCs 100, 100, . . . to respective terminal apparatuses 2, 2, . . . .

For example, when receiving the connect request from the first terminal apparatus 2, the virtualization server 101 activates the corresponding first virtual PC 100. At this time, the virtualization server 101 detects the first image transmitting device 3 among plural image transmitting devices 3, 3, . . . , which has not been assigned yet. Then, the virtualization server 101 assigns the detected first image transmitting device 3 to the first virtual PC 100. As performing operations as the first virtual PC 100, the controlling unit 10 outputs the image drawing instruction signal to be output in response to processing toward the assigned first image transmitting device 3. The first image transmitting device 3 generates the image signal representing a display screen based on the received image drawing instruction signal, encodes the image signal to generate the picture signal, and transmits the picture signal to the first terminal apparatus 2. Then, the first terminal apparatus 2 can start performing operations as the thin client.

In the thin client system according to the embodiment 1, respective terminal apparatuses 2, 2, . . . transmit the connect request signal including user information for identifying users of the respective terminal apparatuses 2, 2, . . . , authentication information for authenticating users and various setting information toward the information processing apparatus 1, when requesting the activation of respective virtual PCs 100, 100, . . . to the information processing apparatus 1. The information processing apparatus 1 includes the controlling unit (connect request obtaining means and setting information obtaining means) 10 that performs operations as the virtualization server 101. When having received the connect request signal from respective terminal apparatuses 2, 2, . . . through the communicating unit 14, the controlling unit 10 performs user authentication processing (decision on allowance of login) based on the received user information and the received authentication information.

In the case that the user authentication processing indicates to be proper user, the controlling unit 10 performing operations as the virtualization server 101 activates respective virtual PCs 100, 100, . . . in accordance with the setting information received from the respective terminal apparatuses 2, 2, . . . . Then, the virtualization server 101 performs login processing of respective terminal apparatuses corresponding to the activated virtual PCs 100, 100, . . . , and assigns respective virtual PCs 100, 100, . . . to the respective terminal apparatuses 2, 2, . . . . Therefore, it is possible to reflect, into the thin client, various setting information of apparatus, such as a PC, having been already utilized by users of the respective terminal apparatuses 2, 2, . . . .

The users of the terminal apparatuses 2, 2, . . . in the thin client system may previously store the various setting information of apparatus, such as a PC, having been already utilized by the users on portable external memories, such as USB memories and integrated circuit (IC) cards. Then, when the activation of the virtual PC 100 is requested to the information processing apparatus 1, the user may connect the external memory to the I/O interface 23, the terminal apparatus 2 may read out the setting information stored on the external memory, and the terminal apparatus 2 may transmit the user information and the authentication information to the information processing apparatus 1. Therefore, it is possible to transmit the setting information that the user wants toward the information processing apparatus 1.

Alternatively, the user information and the authentication information may be stored on non-volatile memory (not shown) of the terminal apparatus 2 and may be input by the user at the time requesting activation of the terminal apparatus 2. In this alternative case, it may be enough for the user only to push a power switch (not shown) of the terminal apparatus 2 at the time activating the terminal apparatus 2 and requesting activation of the virtual PC 100 to the information processing apparatus 1.

Therefore, the terminal apparatus 2 according to embodiment 1 is configured to start activating in response to the power switch (not shown) pushed under the inactive status, to read out the user information and the authentication information from the memory, to read out the setting information from the external memory, to transmit the connect request signal including these read information toward the information processing apparatus 1, and to request activation of the virtual PC 100. On the contrary, the terminal apparatus 2 according to embodiment 1 is configured to transmit the disconnect request signal for requesting inactivation of the activated virtual PC 100 toward the information processing apparatus 1 in response to the power switch pushed under the active status, and to stop performing operations as the thin client.

As performing operations as the virtualization server 101, the controlling unit 10 confirms whether the activation of respective virtual PCs 100, 100, . . . based on the setting information received from the respective terminal apparatuses 2, 2, . . . causes interference with another virtual PCs 100, 100, . . . having already started performing operations or not, before starting activation of the respective virtual PCs 100, 100, . . . based on the setting information obtained from the respective terminal apparatuses 2, 2, . . . . Thus, it is possible to prevent the interference of the activation of virtual PCs 100, 100, . . . based on the setting information obtained from the respective terminal apparatuses 2, 2, . . . , onto another virtual PCs 100, 100, . . . having already started performing operations. Therefore, it is possible to provide operating environment proper for all the virtual PCs 100, 100, . . . .

Figure 6:
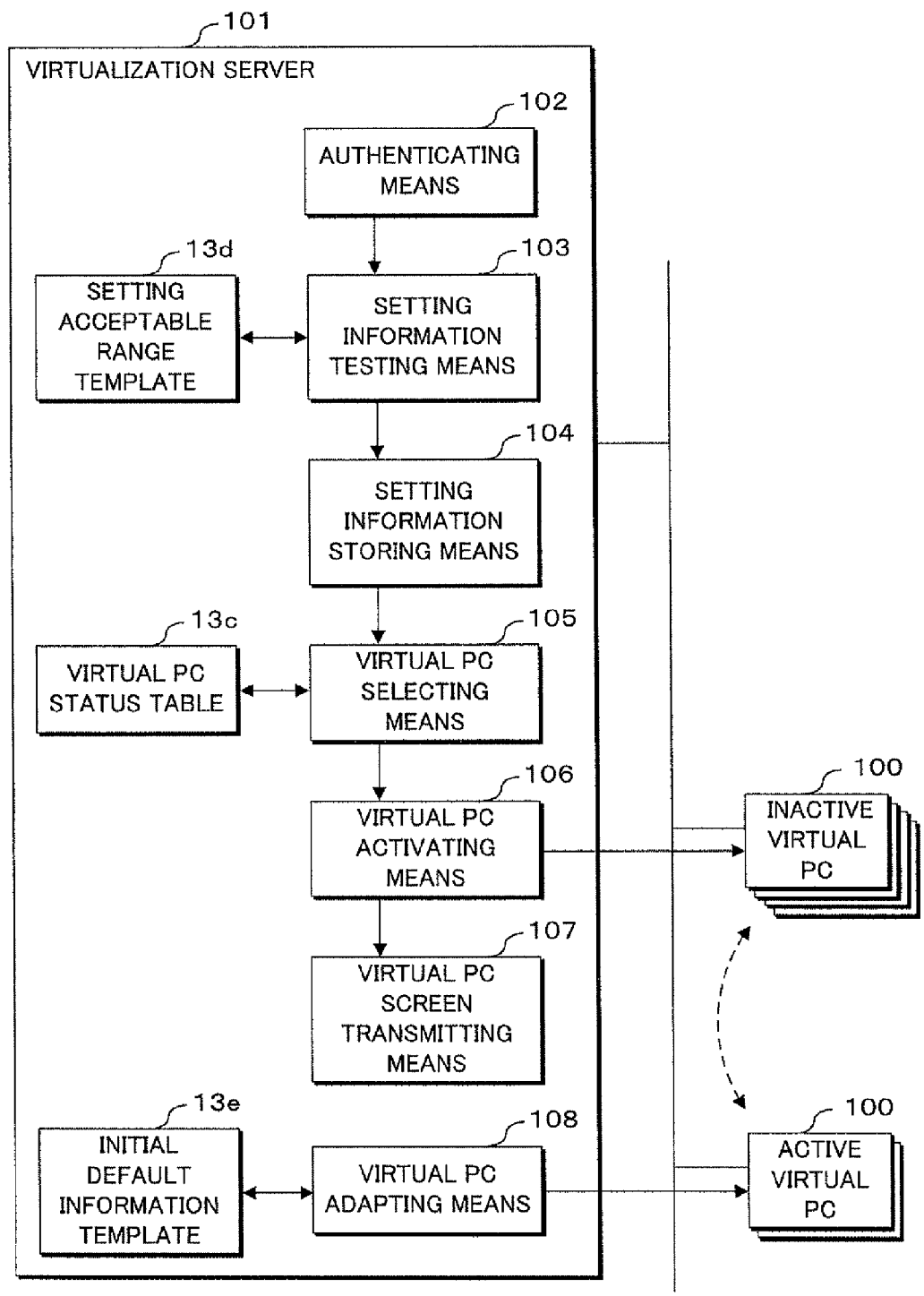
FIG. 6 is a block diagram showing a functional composition of virtualization server.

The controlling unit 10 performing operations as the virtualization server 101 according to embodiment 1 further performs operations as an authenticating means 102, a setting information testing means 103, a setting information storing means 104, a virtual PC selecting means 105, a virtual PC activating means 106, a virtual PC screen transmitting means 107, a virtual PC adapting means 108 and the like, as shown in FIG. 6.

When having received the connect request signal from any terminal apparatus 2 for requesting activation of virtual PC 100, the authenticating means 102 obtains the user information and the authentication information from the received connect request signal. For example, user ID may be utilized as the user information and previously stored password may be utilized as the authentication information.

The storing unit 13 previously stores the user information and the authentication information for respective users who are allowed to utilize the thin client system. The authenticating means 102 performs authentication processing for determining whether it should be allowed about the connect corresponding to the connect request signal obtained from the terminal apparatus 2 or not on the basis of determination results whether the user information and authentication information obtained from the terminal apparatus 2 are identical to any user information and authentication information having been previously stored on the storing unit 13 or not. The authenticating means 102 determines that it should be allowed about the connect corresponding to the connect request signal obtained from the terminal apparatus 2, when having determined that the user information and authentication information obtained from the terminal apparatus 2 are identical to any user information and authentication information having been previously stored on the storing unit 13.

When the connection is authenticated to be allowed by the authenticating means 102, the setting information testing means 103 obtains the setting information from the connect request signal which is obtained from the authenticated terminal apparatus 2. The setting information obtained from the terminal apparatus 2 means, for example, setting information for operations performed by OS (guest OS) of the virtual PC 100, setting information for operations of various applications, setting information for communication through the networks N1, N2, setting information for image processing including GUI, and/or the like.

Specifically, the setting information obtained from the terminal apparatus 2 means, for example, image screen size information, wall paper image data, sound volume information, bookmark information, register value information on the controlling unit, and/or the like. Thus, the setting information testing means 103 obtains setting information that may include, for example, 1024×768 pixels as the image screen size information, bitmap data as the wall paper image data, volume "4" as the sound volume information, URL1, URL 2, URL 3, . . . as the bookmark information, APL 1=reg 1, APL 2=reg 2, . . . as the register value information on the controlling unit, and/or the like.

The setting information testing means (determining means) 103 determines whether the setting information obtained from the connect request signal falls into the acceptable range based on constraint condition being set by the setting acceptable range template 13*d*, or not. In other words, the setting information testing means 103 determines whether the activation of virtual PC 100 causes interference with another virtual PCs 100, 100, . . . or not when the activation of virtual PC 100 is started in accordance with the setting information obtained from the terminal apparatus 2. Specifically, the setting information testing means 103 determines whether the setting information obtained from the connect request signal meet two conditional expressions (expression 1 and expression 2) described below, or not. When the setting information obtained from the connect request signal meet said two conditional expressions, the setting information testing means 103 determines that the setting information obtained from the connect request signal falls into the acceptable range based on constraint condition being set by the setting acceptable range template 13*d*.

The following expression is utilized as a resource conditional expression.

$$R(t) \times \theta 1 \geq f1 \times \alpha 1 + g1 \times \beta 1 \qquad \text{(expression 1)}$$

R(t): whole resource amount required currently; f1: image screen size; g1: virtual memory size; θ1, α1 and β1: coefficient The expression 1 described above is for determining, for example, whether the virtual memory implemented by the RAM 12, storing unit 13 or the like assigned to the virtual PC 100 is falling into the acceptable range or not, in reference to the image screen size and the virtual memory size, in the case the activation is started of the virtual PC 100 based on the setting information obtained from the terminal apparatus 2.

The whole resource amount required currently (R(t)) is sum of calculated amount of hardware resources required for respective virtual PCs 100, 100, . . . when the respective virtual PCs 100, 100, . . . are activated. Every time the virtualization server 101 starts activation of respective virtual PCs 100, 100, . . . , the setting information testing means 103 calculates the resource amount required for respective virtual PCs 100, 100, . . . to be activated, and stores the calculated amount of required resource on the storing unit 13 in association with ID of respective virtual PCs 100, 100, . . . . In addition, the setting information testing means 103 adds the calculated amount of resource required for respective virtual PCs 100, 100, . . . onto the whole resource amount required currently which is stored on the storing unit 13.

Further, every time the virtualization server 101 carries out shutdown of respective virtual PCs 100, 100, . . . , the setting information testing means 103 deletes the resource amount in the storing unit 13 required for the virtual PCs 100, 100, . . . on which the shutdown processing has been performed, and subtracts the resource amount from the whole resource amount required currently which is stored on the storing unit 13. As described above, the virtualization server 101 updates the whole resource amount required currently, every time performing activation processing or shutdown processing for respective virtual PCs 100, 100, . . . . Therefore, it is possible to recognize accurately the whole resource amount required currently which will be updated sequentially.

The image screen size (f1) is included in the setting information obtained from the terminal apparatus 2. Into the "f1", 800×600 pixels, 1028×768 pixels, 1280×768 pixels, 1280×1024 pixels or the like is substituted. The virtual memory size (g1) may be previously set for each virtual PC 100, or may be set in consideration of environment utilized for respective virtual PCs 100, 100, . . . . For example, into the "g1", selected size from 100 MB to 1 GB may be substituted.

Further, it is possible to configure to allow respective users changing the image screen size and the virtual memory size after respective virtual PCs 100, 100, . . . are activated. In such the configuration, it is necessary to re-calculate resource amount required for respective PCs 100, 100, . . . after respective users change the image screen size and the virtual memory size.

Respective coefficients θ1, α1 and β1 may be set in consideration of various conditions, such as allowable virtual PC number for activation, and environment utilized for respective virtual PCs 100, 100, . . . . The resource conditional expression is not limited to be the expression 1 that is for determining whether the virtual memory falls into the acceptable range or not. The resource conditional expression may be another expression that can perform the determination whether respective resources fall into the acceptable range or not.

The following expression is utilized as a performance conditional expression.

$$P(t) \times \theta_2 \geq f_2 \times \alpha_2 + g_2 \times \beta_2 + h_2 \times \gamma_2 \quad \text{(expression 2)}$$

P(t): whole of current performance amount; f2: priority in utilized memory; g2: scheduling priority; h2: visual effect priority; θ1, α1, β2 and γ2: coefficient The expression 2 described above is for determining, for example, whether the utilization rate of controlling unit 10 assigned to respective virtual PCs 100, 100, . . . is falling into the acceptable range or not, in the case the activation is started of respective virtual PCs 100, 100, . . . based on all or part of priorities, the priority in utilized memory, the scheduling priority and the visual effect priority.

The whole of current performance amount (P(t)) is sum of performance amount calculated for respective virtual PCs 100, 100, . . . every time the virtualization server 101 starts activation of respective virtual PCs 100, 100, . . . . The setting information testing means 103 calculates performance amount of respective virtual PCs 100, 100 . . . to be activated every time the virtualization server 101 starts activation of respective virtual PCs 100, 100, . . . . Then, the calculated performance amount is stored on the storing unit 13 in accordance with the ID of respective virtual PCs 100, 100, . . . . The setting information testing means 103 further adds the performance amount calculated for respective virtual PCs 100, 100, . . . onto the whole of current performance amount stored on the storing unit 13.

The setting information testing means 103 additionally deletes the performance amount for respective virtual PCs 100, 100, . . . , on which the shutdown processing has been performed, from the storing unit 13, every time the virtualization server 101 performs the shutdown processing on respective virtual PCs 100, 100, . . . . Then, the setting information testing means 103 subtracts the performance amount from the whole resource amount required currently which is stored on the storing unit 13. Thus, the whole of current performance amount is updated every time the virtualization server 101 performs the activation processing or the shut down processing of respective virtual PCs 100, 100, . . . . Therefore, it is possible to recognize accurately the whole resource amount required currently which will be updated sequentially.

The priority in utilized memory (f2) is set in comparison between the case that the virtual memory implemented by the RAM 12 and the storing unit 13 assigned to respective virtual PCs 100, 100, . . . is preferred to be utilized as program region for performing various programs, and another case that the virtual memory implemented by the RAM 12 and the storing unit 13 assigned to respective virtual PCs 100, 100, . . . is preferred to be utilized as system cash region.

The scheduling priority (g2) is set in comparison between the case that the controlling unit is preferably assigned to the program for displaying images during the multi processes being performed by the controlling unit 10 assigned to respective virtual PCs 100, 100, and another case that the controlling unit 10 is preferably assigned to the program being performed in background.

The virtual effect priority (h2) is set in comparison between the case that performance of GUI is preferred, for example, and another case that virtual effect, such as image quality, is preferred. The priority in utilized memory, the scheduling priority and the visual effect priority may be included in the setting information obtained from the terminal apparatus 2, and respective priorities obtained from the obtained setting information may be substituted to the expression 2. It may be possible to allow respective users to select the priority through respective terminal apparatus 2 when respective virtual PCs 100, 100, . . . are activated, and to allow respective users to substitute respective priorities into the expression 2.

It may be configured to allow respective users to change the priority in utilized memory, the scheduling priority and the visual effect priority after the activation of respective virtual PCs 100, 100, . . . . In such the configuration, it is necessary to recalculate performance amount of respective PCs 100, 100, . . . after respective users change the priority in utilized memory, the scheduling priority and the visual effect priority.

Respective coefficients θ2, α2, β2 and γ2 may be set in consideration of various conditions, such as allowable virtual PC number for activation, and environment utilized for respective virtual PCs 100, 100, . . . . The performance conditional expression is not limited to be the expression 2 that is for determining whether the utilization rate of controlling unit 10 falls into the acceptable range or not. The performance conditional expression may be another expression that can perform the determination whether the processing speed of controlling unit 10 and/or the processing power of image transmitting device 3 fall into the acceptable range or not.

In the case that the setting information testing means 103 determines that the setting information obtained from respective terminal apparatuses 2, 2, . . . fall into the acceptable range, the setting information storing means 104 temporally stores the setting information obtained from respective terminal apparatuses 2, 2, . . . onto the RAM 12, as described above. In the case that the setting information testing means 103 determines that the setting information obtained from respective terminal apparatuses 2, 2, . . . do not fall into the acceptable range, the setting information storing means 104 stores the fact on the RAM 12. The RAM 12 stores setting information for setting default values, in advance. Thus, in the case that the setting information testing means 103 determines that the setting information obtained from respective terminal apparatuses 2, 2, . . . do not fall into the acceptable range, the virtual PC 100 is activated in accordance with the default values.

The virtual PC selecting means 105 selects a virtual PC 100 (OS program 13*a*) corresponding to the terminal apparatus 2 from which the connect request signal has been transmitted, in accordance with the registered data in the virtual PC status table 13*c*, from not yet activated virtual PCs 100, 100, . . . . The virtual PC selecting means 105 may check status information of respective virtual PCs 100, 100, . . . registered in the virtual PC status table 13*c*, in the registered order. Then, the virtual PC selecting means 105 may select the not-yet activated virtual PC 100 that is found firstly in the registered order.

The virtual PC selecting means 105 detects not-yet assigned image transmitting device 3 among plural image transmitting devices 3, 3, . . . , and assigns the detected not-yet assigned image transmitting device 3 to the selected virtual PC 100. The virtual PC activating means (setting means, assigning means) 106 activates the not-yet activated virtual PC 100 (OS program 13*a*) selected by the virtual PC selecting means 105, in accordance with the setting information that is obtained from the terminal apparatus 2 and is stored on the RAM 12 by the storing means 104. Furthermore, the virtual PC activating means (setting means, assigning means) 106 starts operations of the image transmitting device 3, sets operating environment of the virtual PC 100 and assigns the set operating environment to the terminal apparatus 2.

In the case that the setting information obtained from the terminal apparatus 2 is not stored on the RAM 12 and the RAM 12 stores the fact that the setting information obtained from the terminal apparatus 2 does not fall into the acceptable range, the virtual PC activating means 106 activates the selected not-yet activated virtual PC 100 in accordance with the setting information stored on the RAM 12 as the default values. Then, the virtual PC activating means 106 starts operations of the image transmitting device 3, sets the operating environment of the virtual PC 100 and assigns the set operating environment to the terminal apparatus 2.

The virtual PC screen transmitting means 107 outputs the image drawing instruction signal, which is transmitted in correspondence with processing by the virtual PC (controlling unit 10) 100, toward the image transmitting device 3 assigned to the virtual PC 100. The image transmitting device 3 generates the image signal for displaying screen based on the obtained image drawing instruction signal, encodes the generated image signal to be the picture signal, and transmits the picture signal to the terminal apparatus 2. Therefore, the terminal apparatus 2 can start performing operations as the thin client.

As the controlling unit 10 performing operations as the virtualization server 101 further performs assignment processing of the image transmitting devices 3, 3, . . . and detection processing of the not-yet assigned image transmitting device 3, such the assignment processing and the detection processing may be performed with the table. Specifically, ID (authentication information, e.g., number) may be respectively provided with the image transmitting devices 3, 3, . . . , the status information in the virtual PC status table 13c shown in FIG. 3 may be respectively updated to be "active" corresponding to activated virtual PCs 100, 100, . . . , and the ID of the corresponding transmitting device 3 may be registered.

Therefore, it is possible in accordance with the ID registered in the virtual PC status table 13c to recognize the not-yet assigned image transmitting devices 3, 3, . . . whose ID are not registered in the virtual PC status table 13c, although the ID of assigned image transmitting devices 3, 3, . . . are registered in correspondence with the activated virtual PCs 100, 100, . . . . In the embodiment, the ID of not-yet assigned image transmitting devices 3, 3, . . . are registered in advance in the table, and the ID of assigned image transmitting devices 3, 3, . . . are deleted from the table. Thus, it is possible to recognize that the image transmitting devices 3, 3, . . . whose ID is registered are not-yet assigned image transmitting devices 3, 3, . . . .

In the thin client system according to the embodiment 1, the users of respective terminal apparatuses 2, 2, . . . performing operations as the thin client can push the power switch in order to stop the operations performed by the corresponding virtual PCs 100, 100, . . . . When the power switch is pushed, the terminal apparatus 2 performing operations transmits the disconnect request signal for requesting the operation stop (logout) of the corresponding virtual PC 100 toward the information processing apparatus 1, and then the operations as the thin client are stopped.

When the controlling unit (disconnect request obtaining means) 10 performing operations as the virtualization server 101 obtains the disconnect request signal from the terminal apparatus 2 performing operations as the thin client, the virtual PC adapting means 108 (disconnecting means) identifies the active virtual PC 100 (OS program 13a) corresponding to the terminal apparatus 2, logout processing is performed on the terminal apparatus 2 from the identified virtual PC 100, and the assignment is released of the identified virtual PC 100 to the terminal apparatus 2. Therefore, it is possible to utilize the virtual PCs 100, 100, . . . effectively, because the released virtual PC 100 can be assigned to other terminal apparatuses 2, 2, . . . .

The virtual PC adapting means (initializing means) 108 stops operations (shutdown) of the virtual PC 100 on which the logout processing of the terminal apparatus 2 has been performed, and loads (overwrites) the default information template (initial setting information) 13e on the virtual PC 100 on which the shutdown processing has been performed. Therefore, it is possible to make the shutdown virtual PC 100 become in the initial status (initialization) being set by the default information template 13e.

As described above, the shutdown virtual PC 100 is initialized. Thus, it is possible to configure that the setting conditions for respective virtual PCs 100, 100, . . . are not reflected for the following activation and un-required data are not kept on the RAM 12 or the storing unit 13. Therefore, it is possible to utilize the RAM 12 and the storing unit 13 effectively. In addition, the virtual PC adapting means 108 identifies the image transmitting devices 3, 3, . . . assigned to the virtual PCs 100, 100, . . . by the virtual PC selecting means 105, and the assigned image transmitting devices 3, 3, . . . are also released for other terminal apparatuses 2, 2, . . . . Therefore, it is possible to effectively utilize the image transmitting devices 3, 3, . . . , too.

As described above, the information processing apparatus 1 according to the embodiment 1 can provide the virtual PCs 100, 100, . . . which are activated by the operating environments based on the setting information obtained from the terminal apparatuses 2, 2, . . . , when requested for activation of virtual PCs 100, 100, . . . by the terminal apparatuses 2, 2, . . . . Thus, it is possible to reflect the various setting information of the apparatuses, such as PCs, already having been utilized by respective users of the terminal apparatuses 2, 2, . . . , into the thin client system without bothering manipulation for setting. Hence, it is possible to save time for users' setting manipulation and to improve the convenience of the thin client system. Therefore, it is possible to introduce the thin client system easily for the user who already utilizes the first terminal apparatus and wants to utilize the second terminal apparatus of the thin client system and for the user, such as the elderly and the housewife, who is unfamiliar with manipulation of terminal apparatuses.

In addition, the information processing apparatus 1 according to the embodiment 1 can determine whether the activation of virtual PC 100 based on the setting information received from the terminal apparatus 2 causes interference with another virtual PCs 100, 100, . . . having already started performing operations or not. Thus, it is possible to allow the activation of the terminal apparatus 2 based on the obtained setting information, only in the case that this activation does not cause interference with another virtual PCs 100, 100, . . . . Therefore, it is possible to avoid rapid decrease of performance, resource deficiency and the like in another virtual PCs 100, 100, . . . which will be caused by the activation of new virtual PC 100. Furthermore, the provider of thin client system can make the system be stable in resource conditions and performance conditions, and can prepare the virtual PC based on the setting information which is different among respective users.

When requested the activation of virtual PCs 100, 100, . . . by the terminal apparatuses 2, 2, . . . , the information processing apparatus 1 according to the embodiment 1 performs user authentication. In the case that the request comes from a user who does not have a correct right, the information processing apparatus 1 decides the access based on the request. Therefore, it is possible to provide a safety system having proper security level. When requested the inactivation of respective corresponding virtual PCs 100, 100, . . . by the terminal apparatuses 2, 2, . . . , the information processing apparatus 1 according to the embodiment 1 releases the assignment of respective PCs 100, 100, . . . to the terminal apparatuses 2, 2, ..., and initializes the released respective virtual PCs 100, 100, .... Hence, the various setting information of the virtual PC being set by the previous user have no effect on the virtual PC utilized by the current user. Furthermore, un-required data generated by the previous user are deleted by the initialization. Therefore, it is possible to effectively utilize the hardware resources, such as RAM 12 and storing unit 13.

Figure 7:
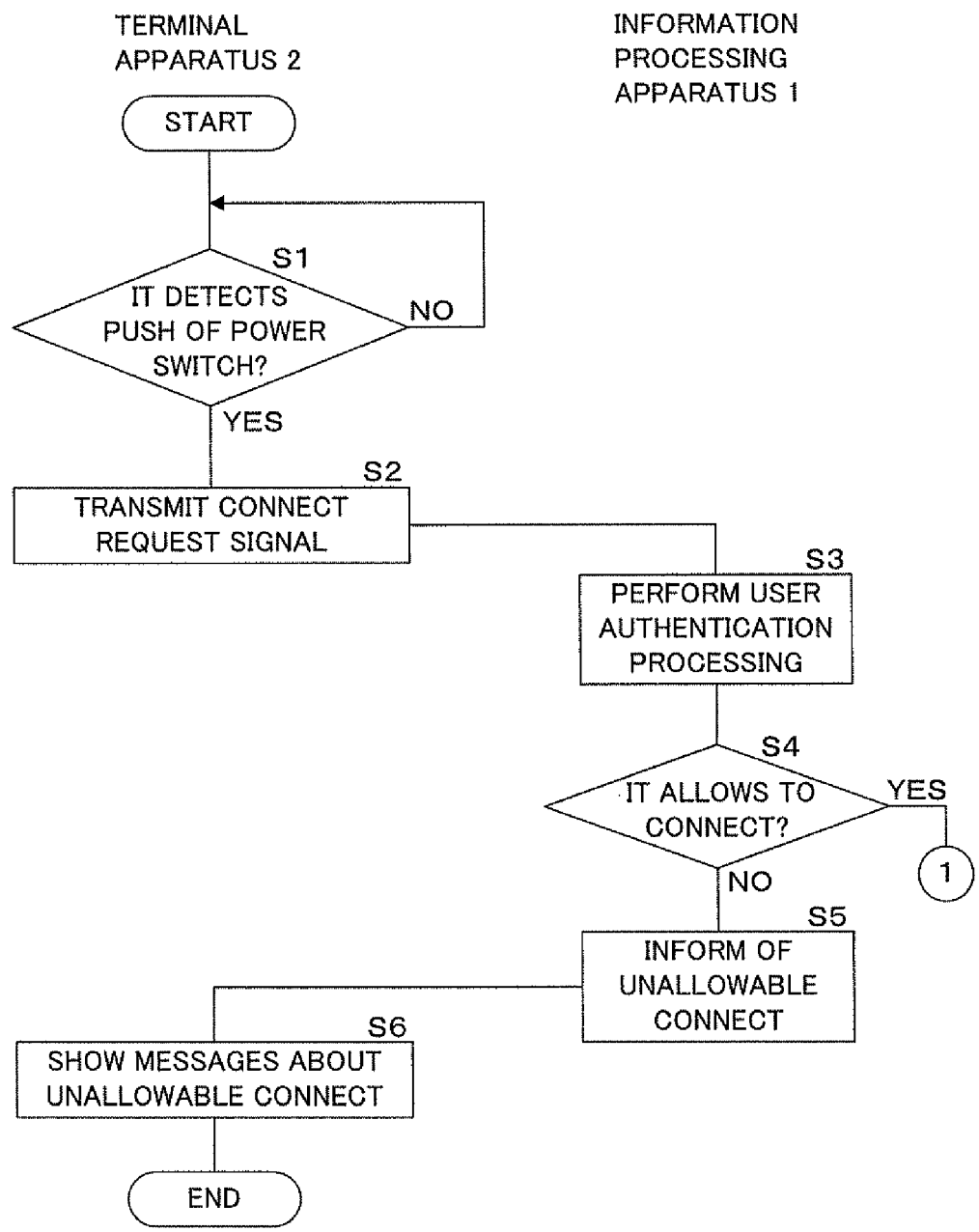
FIG. 7 is a flowchart showing a procedure in the case that the terminal apparatus requested activation of virtual PC to the information processing apparatus.
Figure 8:
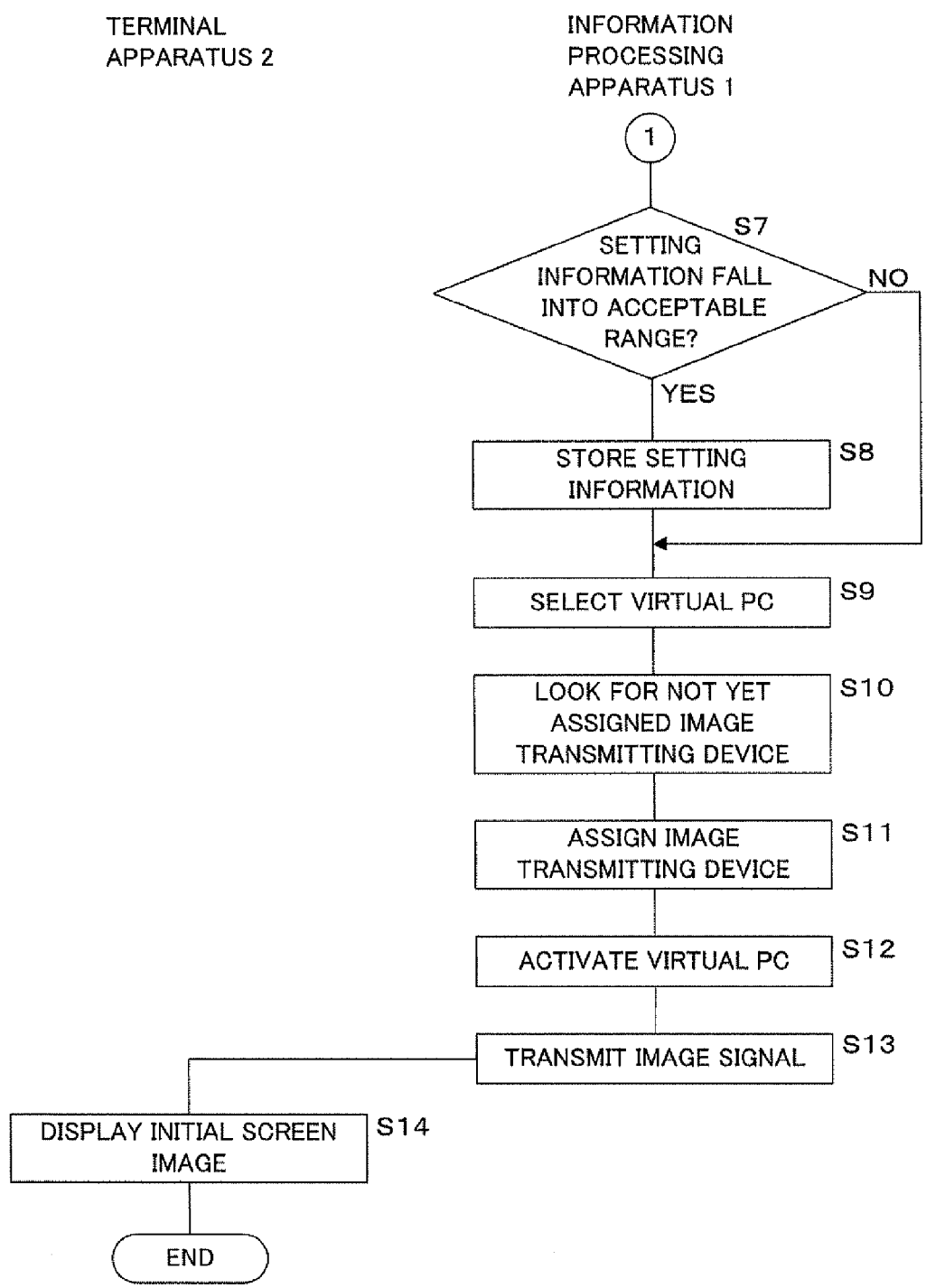
FIG. 8 is a flowchart showing a procedure in the case that the terminal apparatus requests the activation of the virtual PC to the information processing apparatus.

It will be described in reference to flowcharts about procedure performed between the information processing apparatus 1 and the terminal apparatus 2 in the thin client system according to the embodiment 1. FIG. 7 and FIG. 8 are flowcharts showing a procedure in the case that the terminal apparatus requested activation of virtual PC to the information processing apparatus. The processes describe below are performed by respective hardware units of the terminal apparatus 2 shown in FIG. 4, and by the controlling unit 10 in accordance with the control program stored on the ROM 11 or the storing unit 13 of the information processing apparatus 1.

The terminal apparatus 2 determines whether detecting through the I/O interface 23 the fact that the power switch is pushed or not (S1). When having determined that the fact is not detected (S1: NO), the terminal apparatus 2 waits until determining that the fact is detected. When having determined that the fact is detected (S1: YES), the terminal apparatus 2 transmits the connect request signal containing user information, authentication information and setting information from the communicating unit 21 toward the information processing apparatus 1 (S2).

When the information processing apparatus 1 has received the transmitted connect request, the controlling unit 10 (authenticating means 102) of the information processing apparatus 1 performs user authentication processing based on the user information and the authentication information contained in the received connect request signal (S3), and determines whether connect should be allowed or not in accordance with the received connect request (S4). When having determined that the connect should not be allowed (S4: NO), the controlling unit 10 informs the determination results about unallowable connect to the terminal apparatus 2 from which the connect request has been transmitted (S5).

When having been informed of the determination results about unallowable connect from the information processing apparatus 1, the terminal apparatus 2 makes the TV 26 show messages representing the fact that it is impossible to connect with the information processing apparatus 1 (S6), and completes the procedure for requesting activation of virtual PC 100.

When the controlling unit 10 has determined that the connect should be allowed (S4: YES), the controlling unit 10 (setting information testing means 103) determines whether the setting information contained in the received connect request signal from the terminal apparatus 2 fall into the acceptable range based on the constraint condition being set by the setting acceptable range template 13d or not (S7). When it has been determined that the setting information falls into the acceptable range (S7: YES), the controlling unit 10 (setting information storing means 104) temporally stores the setting information received from the terminal apparatus 2 onto the RAM 12 (S8). When it has been determined that the setting information does not fall into the acceptable range (S7: NO), the controlling unit 10 skips the process at the step S8. Then, the controlling unit 10 stores information on the RAM 12 which represents the determination results that the setting information does not fall into the acceptable range.

The controlling unit 10 (virtual PC selecting means 105) selects a virtual PC 100 (OS program 13a) corresponding to the terminal apparatus 2, from which the connect request signal has been transmitted, in accordance with the registered data of the virtual PC status table 13c (S9). Then, the controlling unit 10 looks for the image transmitting device 3 that has not been assigned yet (S10), and assigns the found image transmitting device 3 to the selected virtual PC 100 (S11). For example, the controlling unit 10 may store the correspondence information between IDs of the terminal apparatuses 2, 2, ..., ID of corresponding virtual PC 100 and ID of corresponding image transmitting device 3. Then, the controlling unit 10 may identify the corresponding virtual PC 100 and the corresponding image transmitting device 3, on the basis of the address and the ID of terminal apparatus 2 that has transmitted various signals to the controlling unit 10.

The controlling unit 10 (virtual PC activating means 106) activates the image transmitting device 3 assigned at the step S11, in accordance with the setting information stored on the RAM 12 at the step S8, and activates the virtual PC 100 selected at the step S9 (S12). In the case that the setting information does not fall into the acceptable range and the RAM 12 does not store the setting information obtained from the terminal apparatus 2 at that time, the controlling unit 10 activates the virtual PC 100 selected at the step S9 in accordance with the setting information that has been stored as the default values on the RAM 12 in advance.

When having activated the virtual PC 100, the controlling unit 10 transmits the image signal through the image transmitting device 3 assigned to the virtual PC 100 toward the terminal apparatus 2 from which the connect request signal has been transmitted (S13). The transmitted image signal is for displaying initial screen image on the TV 26 of the terminal apparatus 2. The terminal apparatus 2 makes the TV 26 display the initial screen image based on the image signal obtained from the information processing apparatus 1 (S14), starts performing operations as the thin client, and completes the procedure for requesting activation of virtual PC 100.

Figure 9:
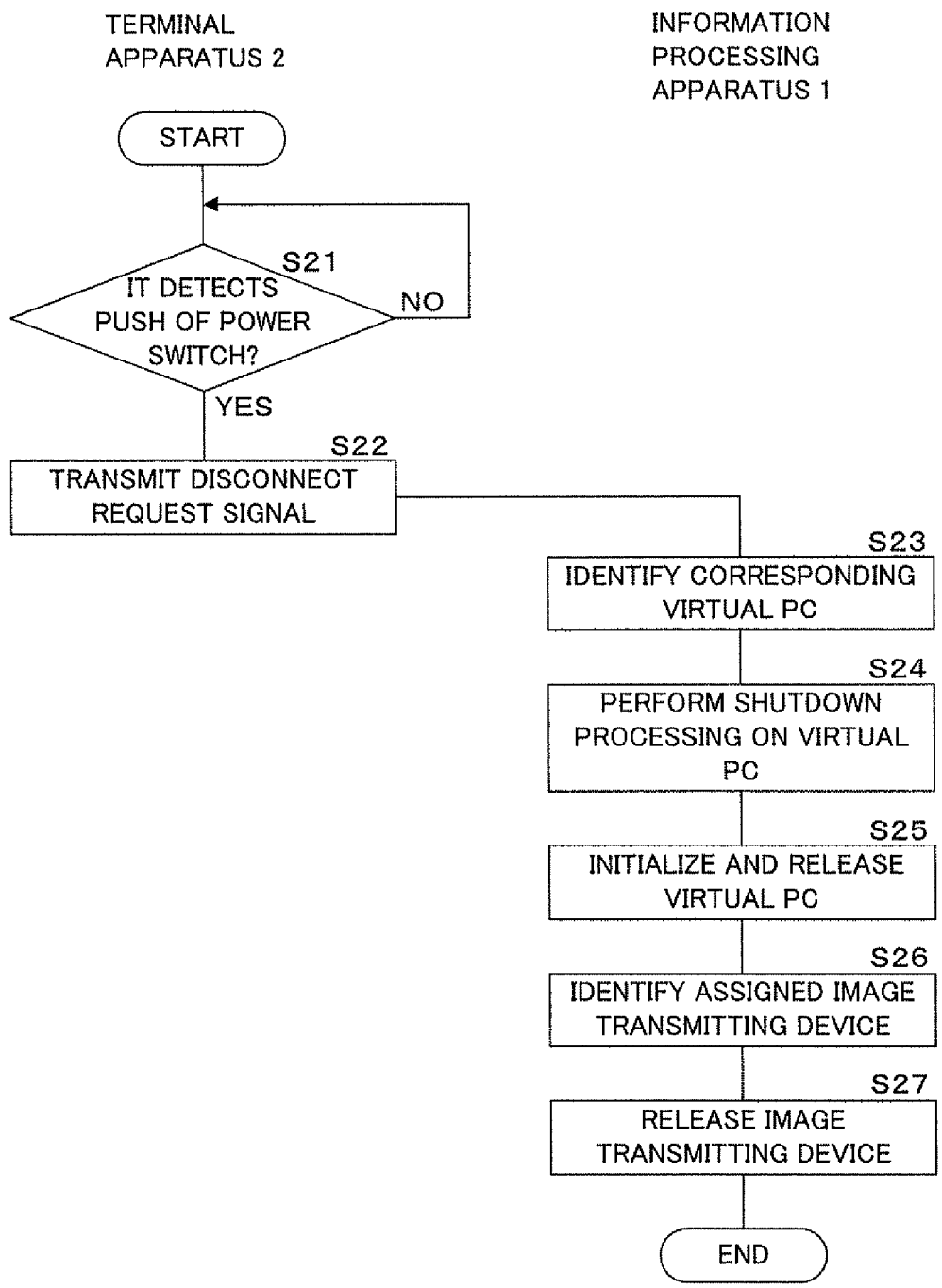
FIG. 9 is a flowchart showing a procedure in the case that the terminal apparatus requests stop of the virtual PC to the information processing apparatus.

FIG. 9 is a flowchart showing a procedure in the case that the terminal apparatus 2 requests stop of the virtual PC 100 to the information processing apparatus 1. The processes describe below are performed by respective hardware units of the terminal apparatus 2 shown in FIG. 4, and by the controlling unit 10 in accordance with the control program stored on the ROM 11 or the storing unit 13 of the information processing apparatus 1.

While performing operations as the thin client, the terminal apparatus 2 determines whether detecting through the I/O interface 23 the fact that the power switch is pushed or not (S21). When having determined that the fact is not detected (S21: NO), the terminal apparatus 2 waits until determining that the fact is detected. When having determined that the fact is detected (S21: YES), the terminal apparatus 2 transmits the disconnect request signal from the communicating unit 21 toward the information processing apparatus 1 (S22).

When having received the transmitted disconnect request signal, the controlling unit 10 of the information processing apparatus 1 identifies the virtual PC 100 corresponding the terminal apparatus 2 from which the disconnect request signal has been transmitted (S23). Then, the controlling unit 10 of the information processing apparatus 1 performs logout processing of the terminal apparatus corresponding to the identified virtual PC 100 and performs shutdown processing on the identified virtual PC 100 (S24). Further, the controlling unit 10 (virtual PC adapting means 108) makes the shut-downed virtual PC 100 download data of the initial default information template 13e in order to be initialized, and releases the shut-downed virtual PC 100 for other terminal apparatuses 2, 2, ... (S25). The controlling unit 10 identifies the image transmitting device 3 assigned to the virtual PC 100 on which the shutdown processing has been performed at the step S24 (S26), further releases the identified image transmitting device 3 for other terminal apparatuses 2, 2, . . . (S27), and completes the procedure for stopping the virtual PC 100.

As described above, it is possible to prepare operating environment of virtual PCs 100, 100, . . . based on the setting information which are different with each other for respective users of the terminal apparatuses 2, 2, . . . , without causing interference on other active virtual PCs 100, 100, . . . in the thin client system. Thus, respective users can utilize the thin client with familiar operating environment, without bothering manipulation for setting. Therefore, it is possible to improve the convenience.

When trying to activate respective virtual PCs 100, 100, . . .

based on the setting information obtained from respective terminal apparatuses 2, 2, . . . , the information processing apparatus 1 described above determines whether the respective setting information fall into the acceptable range based on the setting acceptable range temple 13d. When having determined that the respective setting information do not fall into the acceptable range, the information processing apparatus 1 activates the virtual PCs 100, 100, . . . based on the setting information stored on the RAM 12 as the default values in advance. At that time, the information processing apparatus 1 may show messages, such as "failure of activation with the environment based on the setting information obtained from the terminal apparatus 2" on the initial screen image displayed on the TV 26 of the terminal apparatus 2, after activating the virtual PCs 100, 100, . . . . Thus, users of terminal apparatuses 2, 2, . . . can easily recognize the fact that the virtual PCs, 100, 100, . . . are activated in accordance with the setting information for the default values.

The embodiment 1 is explained with an configuration example where respective terminal apparatuses 2, 2, . . . read out setting information from own connected external memories in order to transmit the setting information to the information processing apparatus 1. Alternatively, the setting information may be stored on non-volatile memories (not shown) of respective terminal apparatuses 2, 2, . . . . In the alternative configuration, users of terminal apparatuses 2, 2, . . . do not require inserting such external memories into the terminal apparatuses 2, 2, . . . for activating the terminal apparatuses as the thin clients.

The embodiment 1 is explained with an configuration example where respective terminal apparatuses 2, 2, . . . request operation stop of corresponding virtual PCs 100, 100, . . . and then the corresponding virtual PCs 100, 100, . . . are shut-downed. Alternatively, respective terminal apparatuses 2, 2, . . . corresponding to the virtual PCs 100, 100, . . . takes logout processing, and then the respective virtual PCs 100, 100, . . . takes initialization based on the initial default information templates 13e without shutdown of respective virtual PCs 100, 100, . . . in order to make the respective virtual PCs 100, 100, . . . become in the hot standby status. In the alternative configuration, it is possible to save time for activating respective virtual PCs 100, 100, . . . for which respective terminal apparatuses 2, 2, . . . newly request the activation.

(Embodiment 2)

It will be described below about thin client system according to embodiment 2. The thin client system according to the embodiment 2 is implemented with configurations similar to those of the thin client system according to the embodiment 1 described above. Thus, it will not be described in detail about the configurations of information processing apparatus 1 and terminal apparatus 2 in the thin client system according to the embodiment 2.

The information processing apparatus 1 according to the embodiment 2 has configurations as shown in FIG. 2, and has the storing unit 13 storing the setting information registration table 13f as shown in FIG. 10. FIG. 10 is a schematic view showing registered data of the setting information registration table 13f. As shown in FIG. 10, the setting information registration table 13f stores user information for identifying user, authentication information for utilizing user authentication and setting information in association with each other, for respective users allowed to utilize the thin client system. Every time performing shutdown processing on respective virtual PCs 100, 100, . . . having been activated in accordance with the setting information obtained from respective terminal apparatuses 2, 2, . . . , the controlling unit 10 (virtual PC adapting means 108) registers data of setting information registration table 13f as shown in the embodiment 1.

It is assumed that respective users of terminal apparatuses 2, 2, . . . want to quit (withdraw) the service of the thin client system. In this assumption, the registered data of setting information registration table 13f is deleted in response to withdrawal request signal obtained from the respective terminal apparatuses 2, 2, . . . . In the case that the administrator of the thin client system receives the withdrawal request signal from each user, the administrator manipulates the information processing apparatus 1 and then the controlling unit 10 deletes the registered data of setting information registration table 13f.

When the shutdown processing has been performed on the respective virtual PCs 100, 100, . . . , the virtual PC adapting means 108 determines whether user information and authentication information for respective users of corresponding terminal apparatuses 2, 2, . . . are already registered on the setting information registration table 13f or not. When having determined that these user information and authentication information are already registered, the virtual PC adapting means 108 updates only setting information. When having determined that these user information and authentication information are not registered yet, the virtual PC adapting means 108 registers all of these user information, authentication information and setting information.

Figure 11:
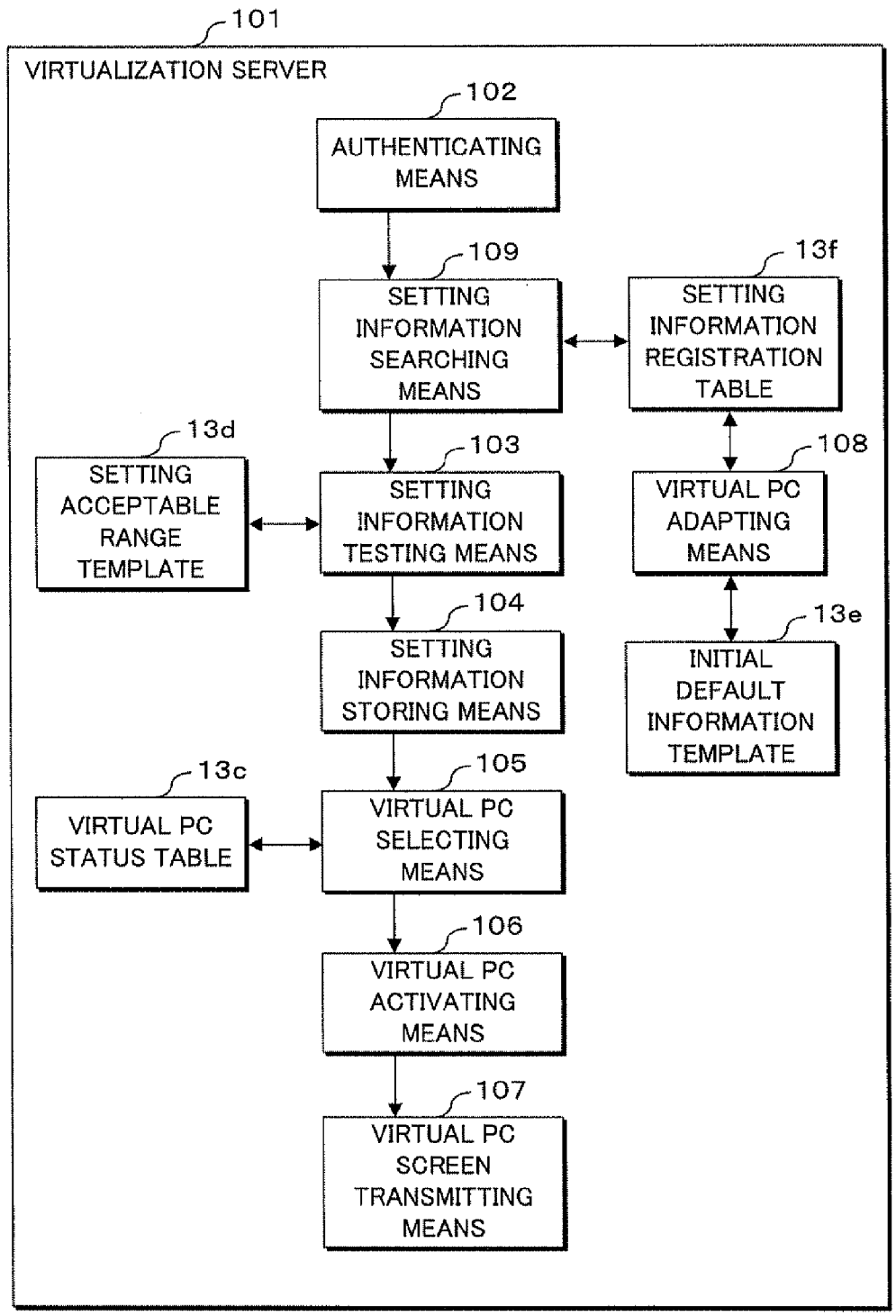
FIG. 11 is a block diagram showing a functional composition of virtualization server.

FIG. 11 is a block diagram showing a functional composition of virtualization server 101. In the information processing apparatus 1 according to the embodiment 2, the controlling unit 10 implements functions as shown in FIG. 6 and functions as a setting information searching means 109, when executing virtualization server program 13b stored on the storing unit 13 and performing operations as the virtualization server 101.

The setting information searching means 109 searches on the setting information registration table 13f of the setting information corresponding to the user information and authentication information contained in the connect request signal received from the terminal apparatus 2 by the authenticating means 102, with checking the user information column and authentication information column of the setting information registration table 13f.

When having found the corresponding setting information registered on the setting information registration table 13f, the setting information searching means 109 reads out the found corresponding setting information from the setting information registration table 13f, and transmits the read setting information to the setting information testing means 103. When having not found the corresponding setting information registered on the setting information registration table 13f, the setting information searching means 109 transmits the setting information contained in the connect request signal obtained from respective terminal apparatuses 2, 2, . . . toward the setting information testing means 103.

Then, the setting information testing means 103 determines whether such the setting information falls into the acceptable range based on the constraint condition being set by the setting acceptable range template 13*d*. Said such the setting information means the setting information transmitted from the setting information searching means 109 (i.e., the setting information having been registered in the setting information registration table 13*f*), or the setting information obtained from the terminal apparatus 2.

The setting information testing means 103, the setting information storing mean 104, the virtual PC selecting means 105, the virtual PC activating means 106 and the virtual PC screen transmitting mean 107 performs processes similar to those explained in the embodiment 1. The virtual PC adapting means 108 performs processes explained in the embodiment 1 and processes for registering or updating these user information, authentication information and setting information of respective terminal apparatuses 2, 2, . . . onto the setting information registration table 13*f* after the shutdown processing is performed on respective virtual PCs 100, 100, . . . as described above.

Figure 12:
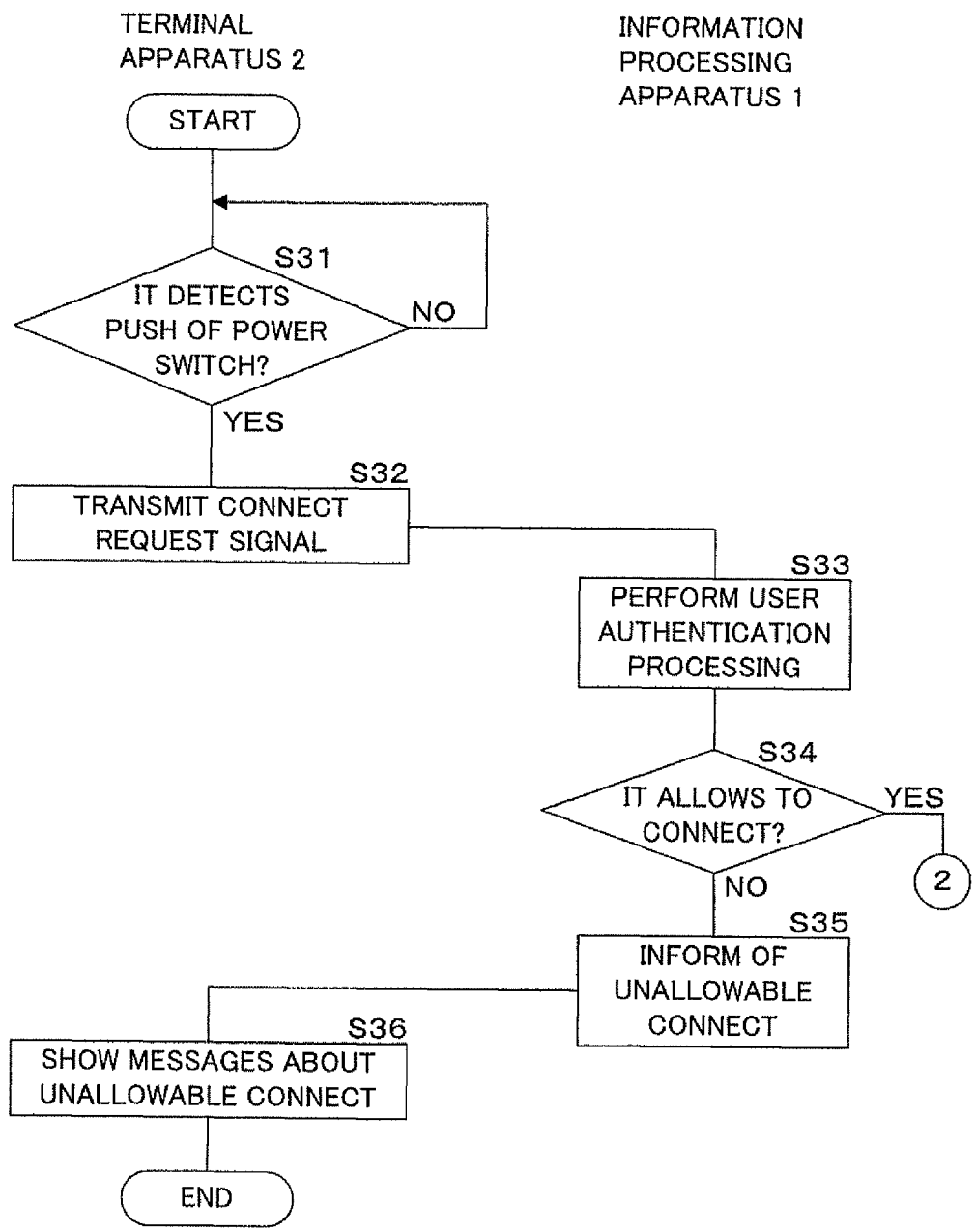
FIG. 12 is a flowchart showing a procedure in the case that the terminal apparatus requests activation of virtual PC to the information processing apparatus.
Figure 13:
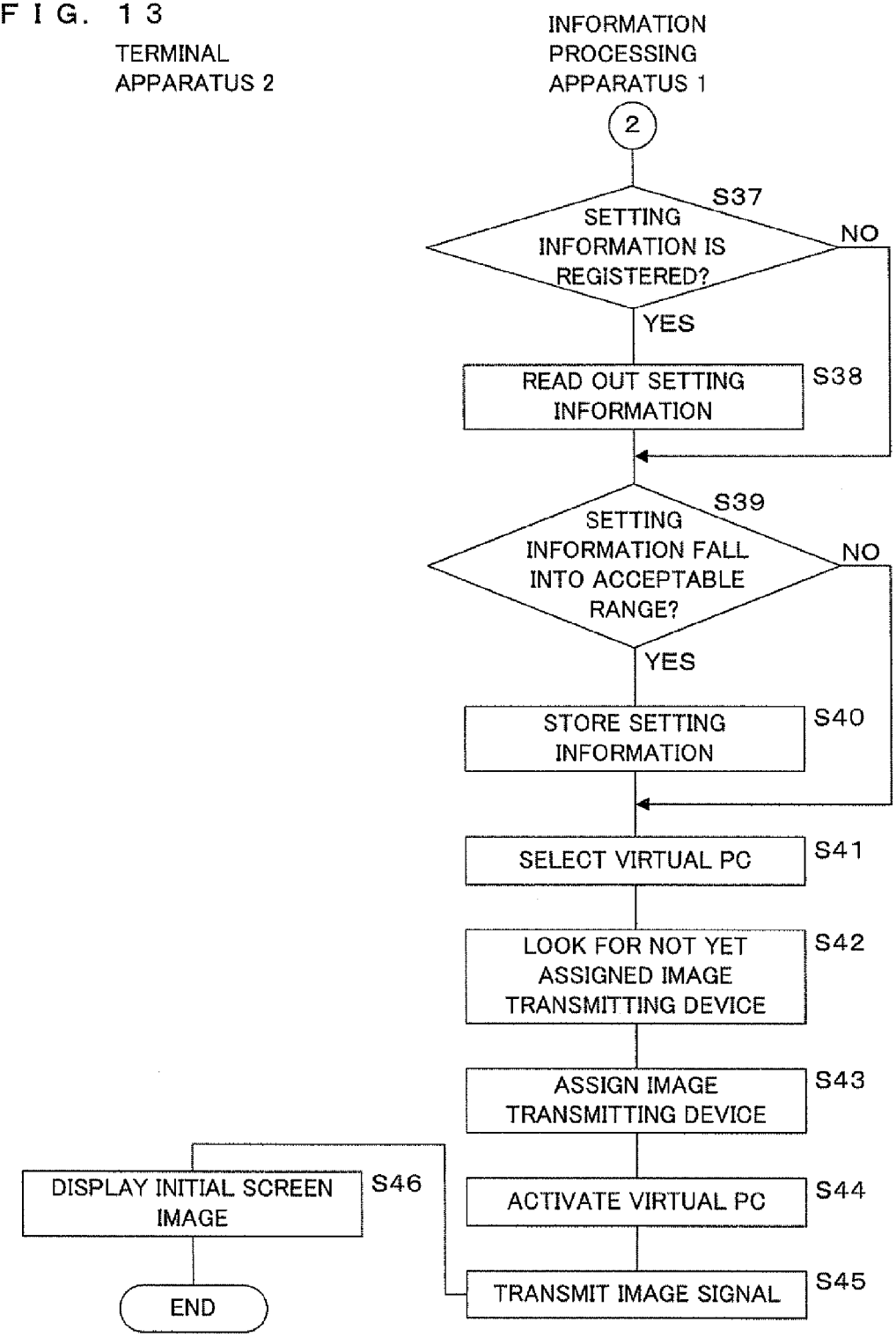
FIG. 13 is a flowchart showing a procedure in the case that the terminal apparatus request the activation of the virtual PC to the information processing apparatus.

It will be described below in reference to flowcharts about detailed procedure performed between the information processing apparatus 1 and the terminal apparatus 2. FIG. 12 and FIG. 13 are flowcharts showing a procedure in the case that the terminal apparatus 2 requests activation of the virtual PC 100 to the information processing apparatus 1. The processes describe below are performed by respective hardware units of the terminal apparatus 2 shown in FIG. 4, and by the controlling unit 10 in accordance with the control program stored on the ROM 11 or the storing unit 13 of the information processing apparatus 1.

The terminal apparatus 2 determines whether detecting through the I/O interface 23 the fact that the power switch is pushed or not (S31). When having determined that the fact is not detected (S31: NO), the terminal apparatus 2 waits until determining that the fact is detected. When having determined that the fact is detected (S21: YES), the terminal apparatus 2 transmits the connect request signal containing the user information and authentication information of the terminal apparatus 2 from the communicating unit 21 toward the information processing apparatus 1 (S32).

When the information processing apparatus 1 has received the connect request signal from the terminal apparatus 2, the controlling unit 10 (authenticating means 102) of the information processing apparatus 1 performs user authenticating processing based on the user information and the authentication information contained in the received connect request signal (S33), and determines whether connect should be allowed or not in accordance with the received connect request (S34). When having determined that the connect should not be allowed (S34: NO), the controlling unit 10 informs the determination results about unallowable connect to the terminal apparatus 2 from which the connect request has been transmitted (S35).

When having been informed of the determination results about unallowable connect from the information processing apparatus 1, the terminal apparatus 2 makes the TV 26 show messages representing the fact that it is impossible to connect with the information processing apparatus 1 (S36), and completes the procedure for requesting activation of virtual PC 100.

When the controlling unit 10 has determined that the connect should be allowed (S34: YES), the controlling unit 10 (setting information searching means 109) searches on the setting information registration table 13*f* of the setting information contained in the connect request signal obtained from the terminal apparatus 2 (S37). When having found the corresponding setting information registered on the setting information registration table 13*f* (S37: YES), the controlling unit 10 reads out the found corresponding setting information from the setting information registration table 13*f* (S38). When having not found the corresponding setting information registered on the setting information registration table 13*f* (S37: NO), the controlling unit 10 skips the process at the step S38.

Then, the controlling unit 10 (setting information testing means 103) determines whether the setting information contained in the received connect request signal from the terminal apparatus 2 falls into the acceptable range based on the constraint condition being set by the setting acceptable range template 13*d* or not (S39). When it has been determined that the setting information falls into the acceptable range (S39: YES), the controlling unit 10 (setting information storing means 104) temporally stores the setting information being read out from the setting information registration table 13*f* or the setting information obtained from the terminal apparatus 2 onto the RAM 12 (S40). When it has been determined that the setting information does not fall into the acceptable range (S39: NO), the controlling unit 10 skips the process at the step S40. Then, the controlling unit 10 stores information on the RAM 12 which represents the determination results that the setting information does not fall into the acceptable range.

The controlling unit 10 (virtual PC selecting means 105) selects a virtual PC 100 (OS program 13*a*) corresponding to the terminal apparatus 2, from which the connect request signal has been transmitted, in accordance with the registered data of the virtual PC status table 13*c* (S41). Then, the controlling unit 10 looks for the image transmitting device 3 that has not been assigned yet (S42), and assigns the found image transmitting device 3 to the selected virtual PC 100 (S43).

The controlling unit 10 (virtual PC activating means 106) activates the image transmitting device 3 assigned at the step S43, in accordance with the setting information stored on the RAM 12 at the step S40, and activates the virtual PC 100 selected at the step S41 (S44). In the case that the setting information does not fall into the acceptable range and the RAM 12 does not store the setting information obtained from the terminal apparatus 2 at that time, the controlling unit 10 activates the virtual PC 100 selected at the step S41 in accordance with the setting information that has been stored as the default values on the RAM 12 in advance.

When having activated the virtual PC 100, the controlling unit 10 transmits the image signal through the image transmitting device 3 assigned to the virtual PC 100 toward the terminal apparatus 2 from which the connect request signal has been transmitted (S45). The transmitted image signal is for displaying initial screen image on the TV 26 of the terminal apparatus 2. The terminal apparatus 2 makes the TV 26 display the initial screen image based on the image signal obtained from the information processing apparatus 1 (S46), starts performing operations as the thin client, and completes the procedure for requesting activation of virtual PC 100.

Figure 14:
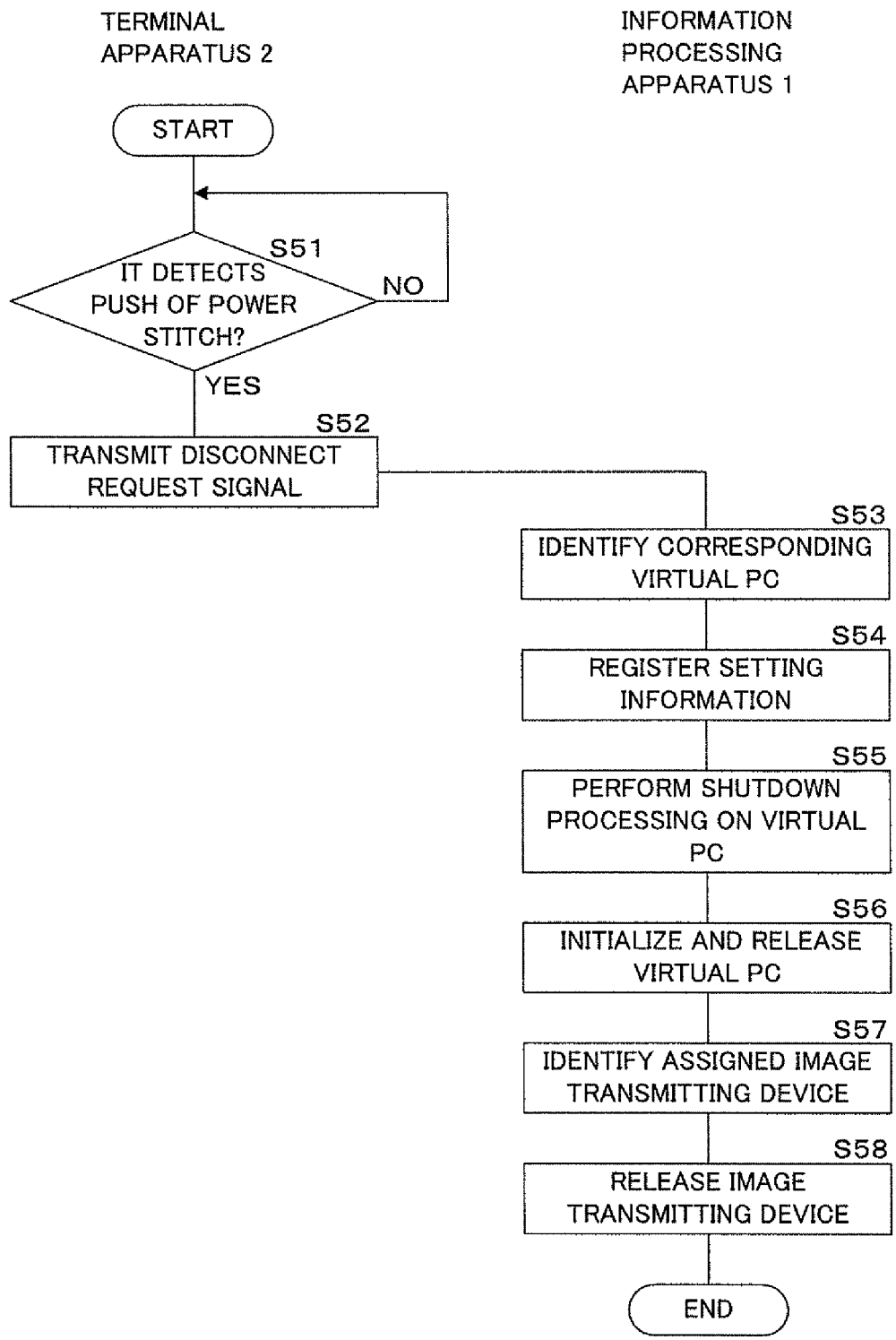
FIG. 14 is a flowchart showing a procedure in the case that the terminal apparatus requests stop of the virtual PC to the information processing apparatus.

FIG. 14 is a flowchart showing a procedure in the case that the terminal apparatus 2 requests stop of the virtual PC 100 to the information processing apparatus 1. The processes describe below are performed by respective hardware units of the terminal apparatus 2 shown in FIG. 4, and by the controlling unit 10 in accordance with the control program stored on the ROM 11 or the storing unit 13 of the information processing apparatus 1.

While performing operations as the thin client, the terminal apparatus 2 determines whether detecting through the I/O interface 23 the fact that the power switch is pushed or not (S51). When having determined that the fact is not detected (S51: NO), the terminal apparatus 2 waits until determining that the fact is detected. When having determined that the fact is detected (S51: YES), the terminal apparatus 2 transmits the disconnect request signal from the communicating unit 21 toward the information processing apparatus 1 (S52).

When having received the transmitted disconnect request signal, the controlling unit 10 of the information processing apparatus 1 identifies the virtual PC 100 corresponding the terminal apparatus 2 from which the disconnect request signal has been transmitted (S53). Then, the controlling unit 10 of the information processing apparatus 1 registers the setting information of the identified virtual PC 100 on the setting information registration table 13f in association with the user information and authentication information of the corresponding terminal apparatus 2 (S54). The controlling unit 10 performs logout processing of the terminal apparatus corresponding to the virtual PC 100 identified at the step S53 and performs shutdown processing on the identified virtual PC 100 (S55).

The controlling unit 10 (virtual PC adapting means 108) makes the shut-downed virtual PC 100 download data of the initial default information template 13e in order to be initialized, and releases the shut-downed virtual PC 100 for other terminal apparatuses 2, 2, . . . (S56). The controlling unit 10 identifies the image transmitting device 3 assigned to the virtual PC 100 on which the shutdown processing has been performed at the step S55 (S57), further releases the identified image transmitting device 3 for other terminal apparatuses 2, 2, . . . (S58), and completes the procedure for stopping the virtual PC 100.

As described above, it is possible to prepare operating environment of virtual PCs 100, 100, . . . based on the setting information which are different with each other for respective users of the terminal apparatuses 2, 2, . . . . In addition, the setting information received from respective terminal apparatuses 2, 2, . . . are managed with the setting information registration table 13f. Thus, respective users of terminal apparatuses 2, 2, . . . do not require inserting external memories into the terminal apparatuses 2, 2, . . . for activating the terminal apparatuses as the thin clients. Therefore, it is possible to improve the convenience.

The information processing apparatus 1 according to the embodiment 2 is explained with an configuration example where the setting information is registered on the setting information registration table 13f and the respective virtual PCs 100, 100, . . . are activated in accordance with the setting information registered on the setting information registration table 13f in response to the next activation request transmitted from respective terminal apparatuses 2, 2, . . . for activating the virtual PCs 100, 100, . . . . Alternatively, the setting information registration table 13f may register memory dump image of respective virtual PCs 100, 100, . . . , instead of the setting information, for example.

In the alternative configuration, the setting information searching means 109 reads out from the setting information registration table 13f of the dump image corresponding to the user information and authentication information contained in the connect request signal received from the terminal apparatus 2 which has been authorized by the authenticating means 102. Then, the virtual PC activating means 106 activates the virtual PC 100 based on the setting information as the default values that are previously stored on the RAM 12. The dump image is read out from the setting information registration table 13f and loaded by the activated virtual PC 100.

In the alternative configuration, the dump image is loaded after the virtual PC 100 is activated. Thus, it cannot determine whether the setting information for activating the virtual PC 100 falls into the acceptable range being set by the setting acceptable range template 13d or not. In view of this point, the setting information registration table 13f may be configured to register utilized resource amount and performance amount of the virtual PC 100 which has downloaded the dump image, in association with each dump image registered on the setting information registration table 13f. Therefore, it is possible to know whether there are virtual PCs 100, 100, . . . that are interfered by the operating environments based on the dump image registered on the setting information registration table 13f which provide the operation of the given virtual PC 100.

In the information processing apparatus 1 according to the embodiment 1 and the embodiment 2 described above, it is configured to initialize respective virtual PCs 100, 100, . . . based on the initial default information template 13e, after the shutdown processing have been performed on respective virtual PCs 100, 100, . . . . Therefore, it is possible to assign respective virtual PCs 100, 100, . . . and image transmitting devices 3, 3, . . . to respective terminal apparatuses 2, 2, . . . newly performing login processing, after respective terminal apparatuses 2, 2, . . . have performed logout processing.

It is assumed that respective users of terminal apparatuses 2, 2, . . . want to quit (withdraw) the service of the thin client system. In this assumption, respective virtual PC 100, 100, . . . may be initialized in accordance with the default information template 13e in response to the withdrawal request. Then, it may be configured to keep a given virtual PC 100 and a given image transmitting device 3 assigned to one terminal apparatus 2, from the first activation of said given virtual PC 100 in response to the start (admission) of the thin client system provision service until the quittance (withdrawal) of the thin client system provision service. It means that the respective virtual PCs 100, 100 . . . and the respective image transmitting devices 3, 3, . . . are reserved for corresponding terminal apparatuses 2, 2, . . . . Therefore, it is possible for respective users of terminal apparatuses 2, 2, . . . to utilize the thin client system anytime.

In the embodiment 1 and the embodiment 2 described above, the setting information is illustrated to be put into the connect request signal together with the user information and the authentication information and to be transmitted to the information processing apparatus 1 at the time when respective terminal apparatuses 2, 2, . . . request the activation of virtual PCs 100, 100, . . . to the information processing apparatus 1.

Alternatively, it may be configured to separately transmit the user information, the authentication information and the setting information toward the information processing apparatus 1. For example, only the user information and the authentication information may be put into the connect request signal, the connect request signal may be transmitted to the information processing apparatus 1 at the time when respective terminal apparatuses 2, 2, . . . request the activation of virtual PCs 100, 100, . . . , and then only the setting information may be transmitted from the terminal apparatus 2 to the information processing apparatus 1 in the case that the user authentication results indicate that the connect should be allowed to the information processing apparatus 1. When these configurations are modified to make the setting information be encoded, it is further possible to prevent tamper of the setting information transmitted from the terminal apparatus 2 to the information processing apparatus 1. The setting information may be encoded at the time of being stored on the external memory.

In the case that the setting information is encoded and then transmitted to the information processing apparatus 1, it may be configured to provide with a key for decoding the encoded setting information that is transmitted from the terminal apparatus 2 to the information processing apparatus 1 separately from the setting information. Thus, the information processing apparatus 1 can address improper access against the information processing apparatus 1 without keeping and managing the key. Therefore, it is possible to provide with secure server apparatus for the thin client system. When these configurations are modified to provide with a detecting means for detecting whether the tamper has been caused on the setting information obtained from respective terminal apparatuses 2, 2, . . . or not, it is possible to keep the setting information more securely.

The information processing apparatus 1 according to the embodiment 1 described above is configured to activate respective virtual PCs 100, 100, . . . based on the setting information obtained from terminal apparatuses 2, 2, . . . . The information processing apparatus 1 according to the embodiment 2 described above is configured to activate respective virtual PCs 100, 100, . . . based on the setting information obtained from terminal apparatuses 2, 2, . . . , and further to register the setting information obtained from respective terminal apparatuses 2, 2, . . . . In addition to these configurations, it may be configured that various setting information changed in response to the operations of virtual PCs 100, 100, . . . are transmitted to corresponding terminal apparatuses 2, 2, . . . and that that the corresponding terminal apparatuses 2, 2, . . . store (overwrite) the changed setting information on external memories or overwrite on another setting information having been already registered on the setting information registration table 13*f*. Therefore, respective users can reflect these setting information changed during utilizing the thin client to own following utilization of the thin client.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information processing apparatus having a connecting unit that connects with an external device, comprising:
    an obtaining unit that obtains identification information from the external device connected to the connecting unit;
    a receiving unit that receives operation setting information from the external device connected to the connecting unit;
    an assigning unit that assigns an operating environment based on the operation setting information received by the receiving unit to an external device identified by the identification information that is obtained by the obtaining unit;
    a deciding unit that decides whether it is possible to assign in accordance with the operation setting information received by the receiving unit or not;
    a generating unit that generates plural virtual machines from hardware of the information processing apparatus with virtual machine monitor technique;
    a hardware calculating unit that calculates utilized amounts of the hardware having been already assigned by the assigning unit; and
    a hardware computing unit that computes utilized amounts of the hardware required for assignment of operating environment based on the operation setting information received by the receiving unit, wherein
    the assigning unit modifies operation setting of a virtual machine generated by the generating unit in accordance with the operation setting information received by the receiving unit, and assigns the modified virtual machine to the external device identified by the identification information which is obtained by the obtaining unit, and
    the deciding unit decides, in reference to the utilized amounts calculated by the hardware calculating unit and the utilized amounts computed by the hardware computing unit, whether it is possible to assign in accordance with the operation setting information received by the receiving unit or not.

2. An information processing apparatus according to claim 1, further comprising:
    a plural video cards utilized for image processing, wherein
    the assigning unit assigns an un-assigned video card among the plural video cards to the external device identified by the identification information that is obtained by the obtaining unit.

3. An information processing apparatus according to claim 1, wherein
    the connecting unit connects with plural external devices.

4. An information processing apparatus according to claim 1,
    when the deciding unit decides that it is possible to assign, the assigning unit assigns the operating environment based on the operation setting information received by the receiving unit to the external device identified by the identification information which is obtained by the obtaining unit, and
    when the deciding unit decides that it is not possible to assign, the assigning unit does not assign the operating environment based on the operation setting information received by the receiving unit to the external device identified by the identification information which is obtained by the obtaining unit.

5. An information processing apparatus according to claim 1, further comprising:
    a performance calculating unit that calculates performance amounts of the information processing apparatus having been already assigned by the assigning unit; and
    a performance computing unit that computes performance amounts of the information processing apparatus required for assignment of operating environment based on the operation setting information received by the receiving unit, wherein
    the deciding unit decides, in reference to the performance amounts calculated by the performance calculating unit and the performance amounts computed by the performance computing unit, whether it is possible to assign in accordance with the operation setting information received by the receiving unit or not.

6. An information processing apparatus according to claim 1, further comprising:
    a determining unit that determines whether it is allowed to communicate with the external device identified by the identification information which is obtained by the obtaining unit or not, wherein when the determining unit determines that it is allowed to communicate with the external device identified by the identification information which is obtained by the obtaining unit, the assigning unit assigns the operating environment based on the operation setting information received by the receiving unit to the external device identified by the identification information which is obtained by the obtaining unit, and when the determining unit determines that it is not allowed to communicate with the external device identified by the identification information which is obtained by the obtaining unit, the assigning unit does not assign the operating environment based on the operation setting information received by the receiving unit to the external device identified by the identification information which is obtained by the obtaining unit.

7. An information processing apparatus according to claim 6, further comprising:
   a breaking unit that breaks communication with the external device with which the determining unit determines to allow communicating;
   a releasing unit that releases the operating environment assigned to the external device with which the breaking unit breaks communication; and
   an initializing unit that initializes operation setting of the operating environment released by the releasing unit to be in initial status.

8. An information processing apparatus according to claim 7, further comprising:
   a storing unit that stores default setting information for setting a predetermined operating environment, wherein
   when the deciding unit decides that it is not possible to assign, the assigning unit assigns an operating environment based on the default setting information stored by the storing unit to the external device identified by the identification information which is obtained by the obtaining unit.

9. A non-transitory computer readable medium storing program for a computer having a connecting unit which connects with an external device, wherein
   the program when executed causes the computer to execute steps of:
      obtaining identification information from the external device connected to the connecting unit;
      receiving operation setting information from the external device connected to the connecting unit;
      assigning an operating environment based on the received operation setting information to an external device identified by the obtained identification information;
      deciding whether it is possible to assign in accordance with the received operation setting information or not;
      generating plural virtual machines from hardware of the information processing apparatus with virtual machine monitor technique;
      calculating utilized amounts of the hardware having been already assigned; and
      computing utilized amounts of the hardware required for assignment of operating environment based on the received operation setting information, wherein
   an operation setting of a generated virtual machine is modified in accordance with the received operation setting information, and the modified virtual machine is assigned to the external device identified by the obtained identification information, and
   it is decided, in reference to the utilized amounts calculated and the utilized amounts computed, whether it is possible to assign in accordance with the received operation setting information or not.

10. A non-transitory computer readable medium according to claim 9, wherein
   when it is decided that it is possible to assign, it assigns the operating environment based on the received operation setting information to the external device identified by the obtained identification information, and
   when it is decided that it is not possible to assign, it does not assign the operating environment based on the received operation setting information to the external device identified by the obtained identification information.

11. A non-transitory computer readable medium according to claim 9, wherein
   the program when executed causes the computer to execute further a step of:
      determining whether it is allowed to communicate with the external device identified by the identification information which is obtained by the obtaining unit or not,
   when it is determined to be allowed communicating with the external device identified by the identification information which is obtained by the obtaining unit, the computer assigns the operating environment based on the received operation setting information to the external device identified by the obtained identification information, and
   when it is determined not to be allowed communicating with the external device identified by the identification information which is obtained by the obtaining unit, the computer does not assign the operating environment based on the received operation setting information to the external device identified by the obtained identification information.

12. A non-transitory computer readable medium according to claim 11, wherein
   the program when executed causes the computer to execute further steps of:
      breaking communication with the external device whose communication is determined to be allowed;
      releasing the operating environment assigned to the external device whose communication is broken, and
      initializing operation setting of the released operating environment to be in initial status.

13. An information processing method with an information processing apparatus having a connecting unit which connects with an external device, comprising steps of:
   transmitting identification information from the external device connected with the connecting unit to the information processing apparatus;
   transmitting operation setting information from the external device connected with the connecting unit to the information processing apparatus;
   assigning an operating environment based on the transmitted operation setting information to an external device identified by the transmitted identification information;
   deciding whether it is possible to assign in accordance with the transmitted operation setting information or not;
   generating plural virtual machines from hardware of the information processing apparatus with virtual machine monitor technique;
   calculating utilized amounts of the hardware having been already assigned; and computing utilized amounts of the hardware required for assignment of operating environment based on the transmitted operation setting information, wherein an operation setting of a generated virtual machine is modified in accordance with the transmitted operation setting information, and the modified virtual machine is assigned to the external device identified by the transmitted identification information, and it is decided, in reference to the utilized amounts calculated and the utilized amounts computed, whether it is possible to assign in accordance with the transmitted operation setting information or not.

14. An information processing method according to claim 13, wherein when it is decided that it is possible to assign the operating environment based on the transmitted operation setting information, the environment based on the transmitted operation setting information is assigned to the external device identified by the transmitted identification information, and when it is decided that it is not possible to assign the operating environment based on the transmitted operation setting information, the environment based on the transmitted operation setting information is not assigned to the external device identified by the transmitted identification information.

15. An information processing method according to claim 13, further comprising a step of:

determining whether it is allowed to communicate between the information processing apparatus and the external device identified by the transmitted identification information or not wherein when it is determined to allow communication between the information processing apparatus and the external device identified by the transmitted identification information, an operating environment based on the transmitted operation setting information is assigned to the external device identified by the transmitted identification information, and when it is determined not to allow communication between the information processing apparatus and the external device identified by the transmitted identification information, the operating environment based on the transmitted operation setting information is not assigned to the external device identified by the transmitted identification information.

16. An information processing method according to claim 15, further comprising steps of:

breaking communication between the external device whose communication is determined to be allowed;

releasing the operating environment assigned to the external device whose communication is broken, and initializing operation setting of the released operating environment to be in initial status.

* * * * *